US012480335B2

(12) United States Patent
Bromley et al.

(10) Patent No.: US 12,480,335 B2
(45) Date of Patent: Nov. 25, 2025

(54) MODULE AND AN ATTACHMENT SYSTEM

(71) Applicant: Avantis Hardware Limited, Cannock (GB)

(72) Inventors: Ryan Bromley, Cannock (GB); Thomas Jameson, Cannock (GB)

(73) Assignee: Avantis Hardware Limited, Cannock (GB)

(*) Notice: Subject to any disclaimer, the term of this patent is extended or adjusted under 35 U.S.C. 154(b) by 539 days.

(21) Appl. No.: 17/612,883

(22) PCT Filed: May 20, 2020

(86) PCT No.: PCT/GB2020/051229

§ 371 (c)(1),
(2) Date: Nov. 19, 2021

(87) PCT Pub. No.: WO2020/234588

PCT Pub. Date: Nov. 26, 2020

(65) Prior Publication Data

US 2022/0251875 A1 Aug. 11, 2022

(30) Foreign Application Priority Data

May 20, 2019 (GB) ..................................... 1907108

(51) Int. Cl.

| | |
|---|---|
| ***E05B 45/06*** | (2006.01) |
| ***E05B 9/08*** | (2006.01) |
| ***E05B 47/00*** | (2006.01) |

(52) U.S. Cl.

CPC ................ *E05B 45/06* (2013.01); *E05B 9/08* (2013.01); *E05B 47/0038* (2013.01);

(Continued)

(58) Field of Classification Search

CPC ........ E05B 45/06; E05B 9/08; E05B 47/0038; E05B 2045/0665; E05B 2045/0695; E05B 2047/0069; E05B 2047/0089

(Continued)

(56) References Cited

U.S. PATENT DOCUMENTS

| | | | |
|---|---|---|---|
| 5,149,157 | A | 9/1992 | Laugery et al. |
| 6,950,033 | B1 | 9/2005 | Guyre |

(Continued)

FOREIGN PATENT DOCUMENTS

| | | |
|---|---|---|
| CN | 103116956 A | 5/2013 |
| CN | 203165117 U | 8/2013 |

(Continued)

OTHER PUBLICATIONS

International Search Report and Written Opinion for Application No. PCT/GB2020/051229, dated Jan. 13, 2021.

(Continued)

*Primary Examiner* — Kristina R Fulton
*Assistant Examiner* — James Edward Ignaczewski
(74) *Attorney, Agent, or Firm* — MARSHALL, GERSTEIN & BORUN LLP

(57) ABSTRACT

An attachment system for a door or window, the attachment system being configured to sense a condition of a door or window, the attachment system including: a securing member configured to be mounted to a frame member of the door or window; and a module, configured to be coupled to a frame member by attachment to the securing member, the module including a sensor to sense the condition of the door or window, and the securing member including a resiliently biased clip configured to retain the module in attachment to the securing member selectively, wherein the securing member is configured space the module from at least part of the (Continued)

frame member such that the sensor is positioned to sense the condition of the door or window.

18 Claims, 29 Drawing Sheets

(52) U.S. Cl.
CPC ................. *E05B 2045/0665* (2013.01); *E05B 2045/0695* (2013.01); *E05B 2047/0069* (2013.01); *E05B 2047/0089* (2013.01)

(58) Field of Classification Search
USPC ....................................................... 292/251.5
See application file for complete search history.

(56) References Cited

U.S. PATENT DOCUMENTS

| | | | | |
|---|---|---|---|---|
| 7,690,230 | B2 | 4/2010 | Gray | |
| 9,353,550 | B1 | 5/2016 | Smith, III | |
| 2002/0175812 | A1 | 11/2002 | Hofmann et al. | |
| 2003/0006879 | A1 | 1/2003 | Kang et al. | |
| 2008/0222963 | A1 | 9/2008 | Zwart | |
| 2009/0102649 | A1 | 4/2009 | Diener et al. | |
| 2009/0302995 | A1 | 12/2009 | Park | |
| 2015/0233146 | A1 | 8/2015 | Klevens et al. | |
| 2015/0330140 | A1* | 11/2015 | Kincaid | G08B 13/08<br>324/207.11 |
| 2015/0348385 | A1* | 12/2015 | Lamb | G08B 29/20<br>340/547 |
| 2016/0017640 | A1 | 1/2016 | Soloway et al. | |
| 2016/0054148 | A1 | 2/2016 | Misfatto | |
| 2016/0086482 | A1 | 3/2016 | Hanrahan | |
| 2017/0198496 | A1* | 7/2017 | Beck | E05B 17/22 |
| 2017/0226774 | A1 | 8/2017 | Goldenson | |
| 2019/0040653 | A1* | 2/2019 | Baumgarte | E05B 47/0673 |
| 2019/0051129 | A1 | 2/2019 | Hunt | |
| 2019/0186170 | A1* | 6/2019 | Pfunder | E05B 17/22 |
| 2020/0011088 | A1* | 1/2020 | Harris | G07C 9/00309 |
| 2020/0264244 | A1* | 8/2020 | Long | E06B 7/28 |
| 2022/0058904 | A1* | 2/2022 | Ross | E05B 47/0046 |
| 2022/0101672 | A1* | 3/2022 | Abueshsheikh | G07C 9/00309 |
| 2022/0298828 | A1* | 9/2022 | Cederblad | E05B 47/00 |

FOREIGN PATENT DOCUMENTS

| | | | | |
|---|---|---|---|---|
| CN | 203165118 | U | 8/2013 | |
| CN | 207097167 | U | 3/2018 | |
| DE | 10 2016 125 888 | A1 | 7/2018 | |
| EP | 0 627 537 | A1 | 12/1994 | |
| EP | 3056638 | A1 * | 8/2016 | E05B 17/2084 |
| EP | 2877658 | B1 | 11/2018 | |
| FR | 2581694 | A1 | 11/1986 | |
| GB | 2 223531 | A | 4/1990 | |
| GB | 2356077 | A * | 5/2001 | G08B 13/08 |
| GB | 2 528 468 | A | 1/2016 | |
| GB | 2 556 980 | B | 9/2019 | |
| JP | 2004-150263 | A | 5/2004 | |
| JP | 2012-149452 | A | 8/2012 | |
| JP | 2013-049977 | A | 3/2013 | |
| NL | 1000647 | C1 | 9/1995 | |
| WO | WO-2007/039898 | A2 | 4/2007 | |
| WO | WO-2011/146960 | A1 | 12/2011 | |
| WO | WO-2014/016281 | A1 | 1/2014 | |
| WO | WO-2014/179403 | A1 | 11/2014 | |
| WO | WO-2015/040144 | A1 | 3/2015 | |
| WO | WO-2015/171380 | A1 | 11/2015 | |
| WO | WO-2016012520 | A1 | 1/2016 | |
| WO | WO-2017183843 | A1 | 10/2017 | |
| WO | WO-2018/039607 | A1 | 3/2018 | |
| WO | WO-2018055398 | A1 * | 3/2018 | E05B 13/004 |
| WO | WO-2019018317 | A1 | 1/2019 | |

OTHER PUBLICATIONS

Search Report for Application No. GB1907108.3, dated Jun. 25, 2020.
Combined Search and Examination Report, Application No. GB2215466, dated Dec. 13, 2022.
Examination Report, Application No. GB2215466, mailed Apr. 6, 2023.
European Search Report issued in European Patent Application No. 24215157 mailed Jun. 20, 2025.

* cited by examiner

| HS2 | HS1 | State |
|---|---|---|
| None | None | Open |
| None | N | Closed & Unlocked |
| S | None | Closed & Locked |

Figure 44

| HS2 | HS1 | State |
|---|---|---|
| None | None | Open |
| None | S | Closed & Unlocked |
| N | None | Closed & Locked |

Figure 45

| HS2 | HS1 | State |
|---|---|---|
| None | None | Open |
| N | None | Closed & Unlocked |
| None | S | Closed & Locked |

Figure 46

| HS2 | HS1 | State |
|---|---|---|
| None | None | Open |
| S | None | Closed & Unlocked |
| None | N | Closed & Locked |

Figure 47

MODULE AND AN ATTACHMENT SYSTEM

DESCRIPTION OF INVENTION

Embodiments of the present invention relate to a module for use in determining the condition of a lock or latch mechanism of a door or window, along with associated systems and methods, and an attachment system for use in coupling a module of the system (including a sensor) to a frame member, to a module (including a sensor), a securing member, and to various associated methods.

A door or window may be in at least one of four conditions—open, closed, unlocked and locked. A home-owner or another person may want to check the status of the door or window without having to test the door or window manually—for example, they may wish to check the status while away from home.

Sensors are available which sense the condition of a door or window, and which communicate this to another device (via which the user can determine the condition of the door or window).

There may be a need to attach such a sensor or another element to the door or window frame, for example.

The present invention seeks to provide an improved attachment system for a door or window frame.

Accordingly, there is provided a door or window including: a lock or latch mechanism actuatable between a locked and an unlocked condition; a system configured to determine the condition of the lock or latch mechanism, the system including: a module including first and second sensor units; a magnet configured to be attached to a part of the lock or latch mechanism such that the magnet moves along a magnet path with actuation of the lock or latch mechanism, the magnet having a magnetic axis which is directionally aligned with the magnet path, the magnet path passing both of the first and second sensor units, such that the module is configured to determine a current condition of the lock or latch mechanism by using the first and second sensor units to sense changes in a polarity of a sensed magnetic field generated by the magnet as the magnet moves along the magnet path.

The magnet path may extend from a first side of both the first and second sensor units to a second side of both the first and second sensor units.

The orientation of the magnet may be reversible with respect to the module and the module may include a controller which is configured to learn an orientation of the magnet using the first and second sensor units.

The controller may be further configured to generate a tamper alert in response to the first and/or second sensor units detecting a magnetic field from an external magnet.

The module may be configured to be attached to a first frame member of the door or window and the magnet may be configured to be attached to a second frame member of the door or window, the first and second frame members may be positioned adjacent each other when the window or door is in a closed condition, the first and second frame members may be configured to move apart from each other as the window or door moves towards an open condition, and the first and second sensor units may be configured to detect movement of the magnet away from the module to determine movement of the window or door to the open condition.

The magnet path may be a substantially linear path.

Another aspect provides a module for use in determining the condition of a latch or lock mechanism of a door or window, the module including: first and second sensor units configured to sense changes in a polarity of a sensed magnetic field of a magnet as the magnet moves along a magnet path, the magnet moving along the magnet path with actuation of a lock or latch mechanism between an unlocked and a locked condition, the magnet having a magnetic axis which is directionally aligned with the magnet path and the magnet path passing both of the first and second sensor units, such that the module determines a current condition of the lock or latch mechanism by using the sensed changes in the sensed polarity of a magnetic field generated by the magnet as the magnet moves along the magnet path.

The module may be configured such that the magnet path extends from a first side of both the first and second sensor units to a second side of both the first and second sensor units.

The orientation of the magnet may be reversible with respect to the module and the module includes a controller which is configured to learn an orientation of the magnet using the first and second sensor units.

The controller may be further configured to generate a tamper alert in response to the first and/or second sensor units detecting a magnetic field from an external magnet.

The module may be configured to be attached to a first frame member of the door or window, with the magnet attached to a second frame member of the door or window, the first and second frame members may be positioned adjacent each other when the window or door is in a closed condition, the first and second frame members may be configured to move apart from each other as the window or door moves towards an open condition, and the first and second sensor units may be configured to detect movement of the magnet away from the module to determine movement of the window or door to the open condition.

The magnet path may be a substantially linear path.

Another aspect provides a method of operating a system in relation to a window or door having a lock or latch mechanism actuatable between a locked and an unlocked condition, the method including: providing a module including first and second sensor units; securing the module to a part of the window or door; providing a magnet configured to be attached to a part of the lock or latch mechanism such that the magnet moves along a magnet path with actuation of the lock or latch mechanism, the magnet having a magnetic axis which is directionally aligned with the magnet path, the magnet path passing both of the first and second sensor units; attaching the magnet to the part of the lock or latch mechanism; using the module to determine a current condition of the lock or latch mechanism by using the first and second sensor units to sense changes in a polarity of a sensed magnetic field generated by the magnet as the magnet moves along the magnet path.

The magnet path may extend from a first side of both the first and second sensor units to a second side of both the first and second sensor units.

The orientation of the magnet may be reversible with respect to the module, and the method may further include using a controller of the module to learn an orientation of the magnet using the first and second sensor units.

A method may further include using the controller to generate a tamper alert in response to the first and/or second sensor units detecting a magnetic field from an external magnet.

Securing the module to a part of the window or door may include attaching the module to a first frame member of the door or window, attaching the magnet to the part of the lock or latch mechanism includes attaching the magnet to a second frame member of the door or window, the first and second frame members being positioned adjacent each other when the window or door is in a closed condition, the first and second frame members being configured to move apart from each other as the window or door moves towards an open condition, and the method further including using the first and second sensor units to detect movement of the magnet away from the module to determine movement of the window or door to the open condition.

The magnet path may be a substantially linear path.

Accordingly, there is provided an attachment system for a door or window, the attachment system being configured to sense a condition of a door or window, the attachment system including: a securing member configured to be mounted to a frame member of the door or window; and a module, configured to be coupled to a frame member by attachment to the securing member, the module including a sensor to sense the condition of the door or window, and the securing member including a resiliently biased clip configured to retain the module in attachment to the securing member selectively, wherein the securing member is configured to space the module from at least part of the frame member such that the sensor is positioned to sense the condition of the door or window.

The securing member may be a substantially planar member.

The securing member may include fixing arrangement to secure the securing member to the frame member.

The fixing arrangement may include a fixing element and a fixing receiver, the fixing element may be configured to be received by the fixing receiver and to engage the frame member.

The securing member may include a body defining one or more grooves, the or each groove may be configured to receive at least part of the frame member.

The securing member may include a receiving configuration and the module may include one or more pins, the or each pin may be configured to be received by the receiving configuration, and the resilient clip may be configured to inhibit the removal of the or each pin from the receiving configuration selectively.

The receiving configuration may include an inclined locking surface configured to engage and guide part of at least one of the or each pin.

The resilient clip may include a drive surface and a latch surface, the module may include a latch element including a drive surface and a latch surface, the latch surfaces of the resilient clip and latch element may be configured to engage as the module is secured to the securing member such that the latch surfaces of the resilient clip and latch element engage.

The resilient clip may be part of a coupling configuration of the securing member which further includes an elongate member and an actuation portion, wherein manual operation of the actuation portion may be configured to move at least part of the elongate member to release the resilient clip.

The sensor may be a reed switch.

The sensor may be a mechanical switch.

Another aspect provides a door or window including an attachment system.

The securing arrangement may be configured to fit between a frame of the door or window and a moveable panel of the door or window, such that the moveable panel may be moveable between open and closed conditions without the securing member fouling this operation of the door or window.

The securing member may be inaccessible when the door or window is in the closed condition.

The moveable panel may be configured to move with respect to the frame member when the door or window may be operated between the open and closed conditions.

The moveable panel may be configured to move with the frame member when the door or window is operated between the open and closed conditions.

Another aspect provides a door or window including a frame member and a securing member, wherein the securing member is suitable for use in an attachment system.

Another aspect provides a method of manufacturing a door or window including: providing a frame member; and securing a securing member to the frame member, wherein the door or window is a door or window as above.

Another aspect provides a method of fitting a door or window including: providing a frame member; and securing a securing member to the frame member, wherein the door or window is a door or window as above.

Another aspect provides a method of fitting a module to a door or window, including: identifying a door or window as above; proving a module; and fitting the module to the securing member.

The method may further include operating the door or window to an open condition before fitting the module to the securing member.

Embodiments are described, by way of example only, with reference to the accompanying drawings, in which.

Figure 1:
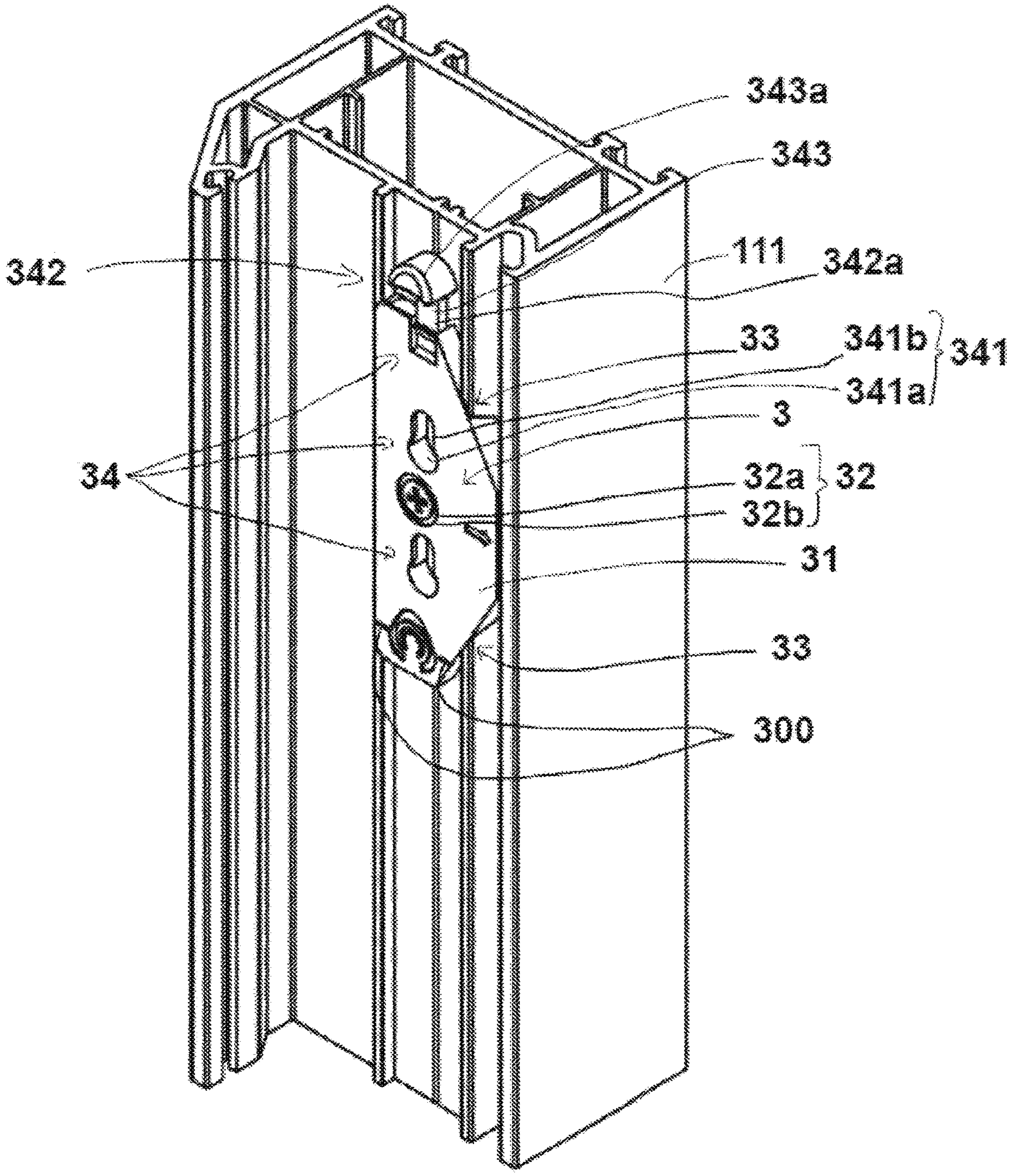
FIG. 1 shows a perspective view of a section of a frame member including a securing member.
Figure 2:
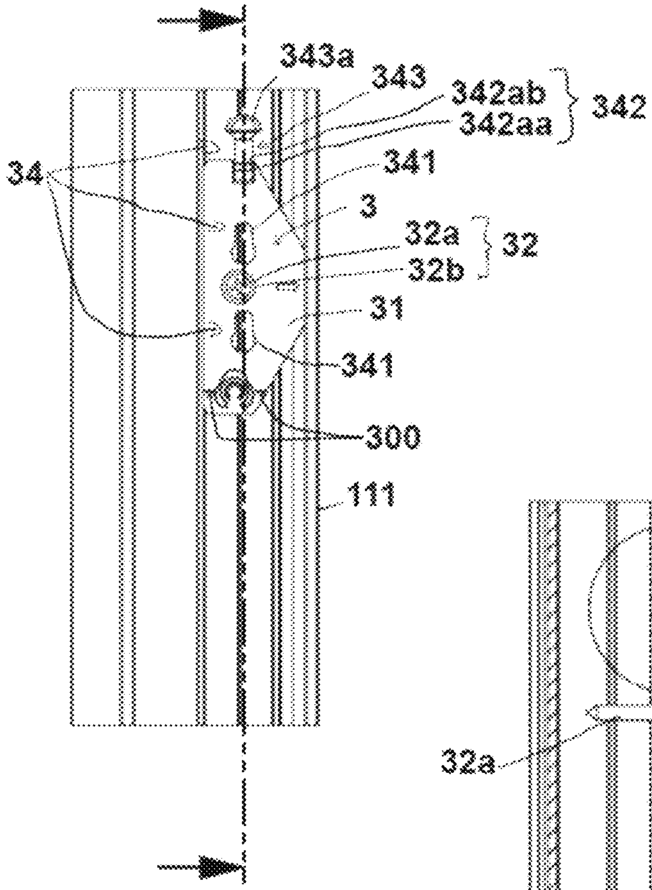
FIG. 2 shows another view of a section of a frame member including a securing member.
Figure 4:
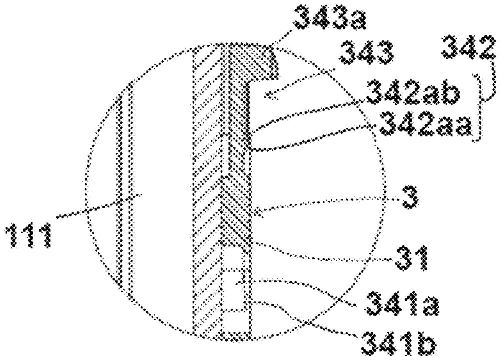
FIG. 4 is a detail view of the part indicated in FIG. 3.
Figure 3:
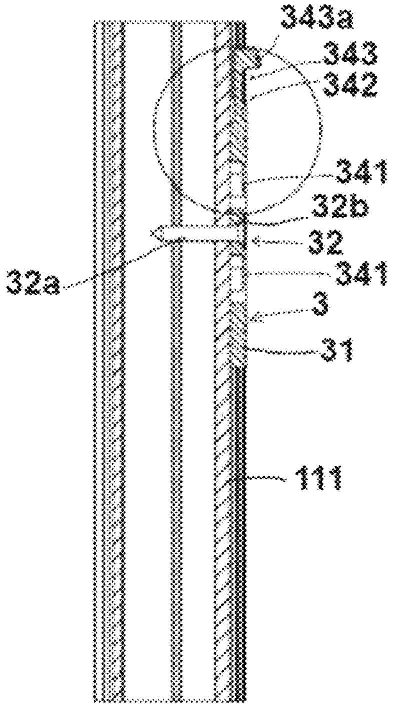
FIG. 3 shows a cross-section view of a section of a frame member including a securing member (through the section line indicated in FIG. 2)
Figure 5:
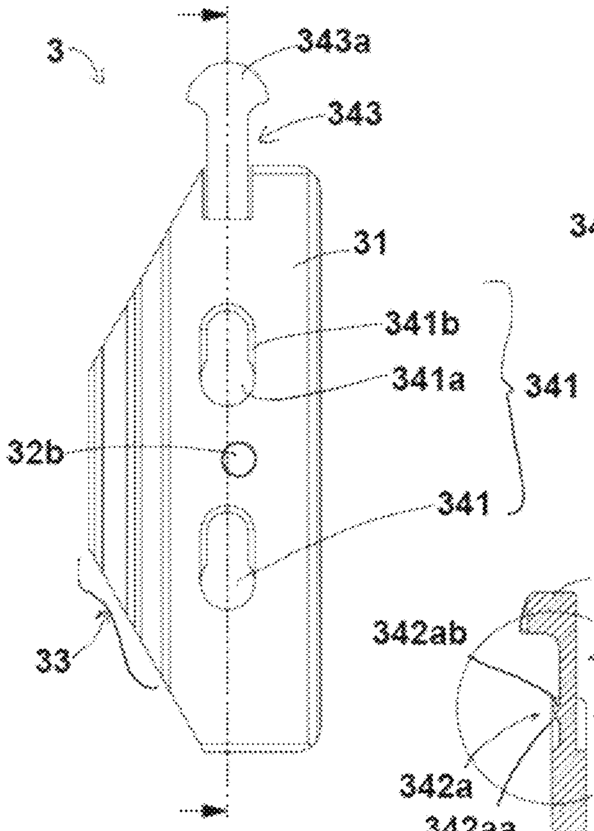
FIG. 5 shows a securing member rear/back/inner face.
Figure 7:
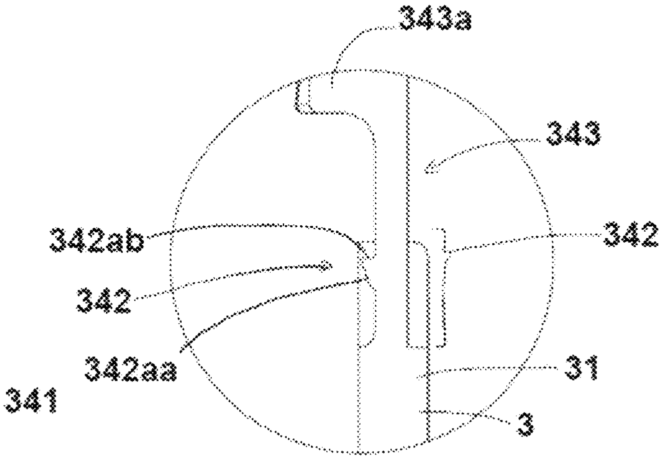
FIG. 7 is a detail view of the part indicated in FIG. 6.
Figure 6:
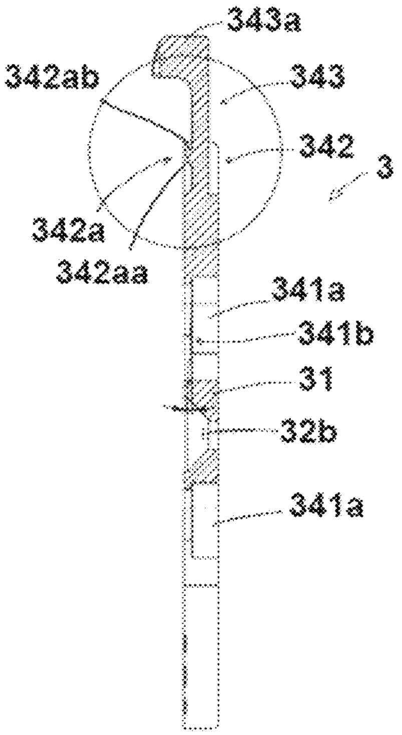
FIG. 6 shows a cross-section view of a securing member (through the section line indicated in FIG. 5)
Figure 8:
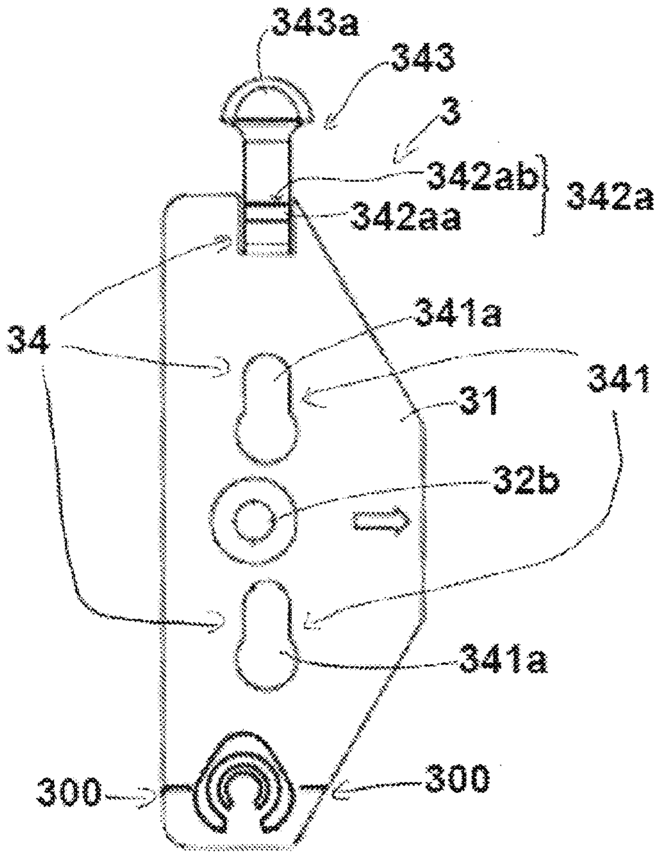
FIG. 8 shows a securing member front/outer face.
Figure 9:
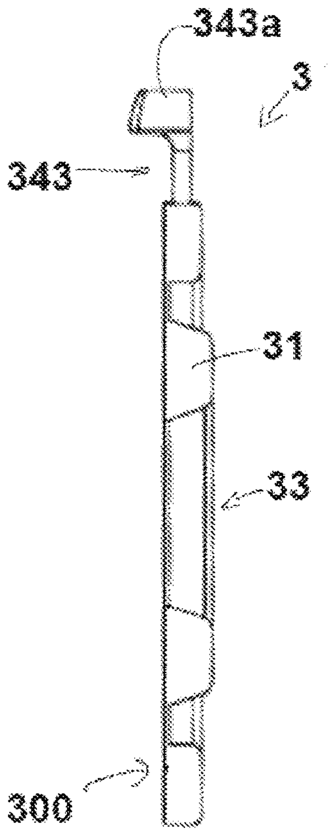
FIG. 9 shows a securing member side view.
Figure 10:
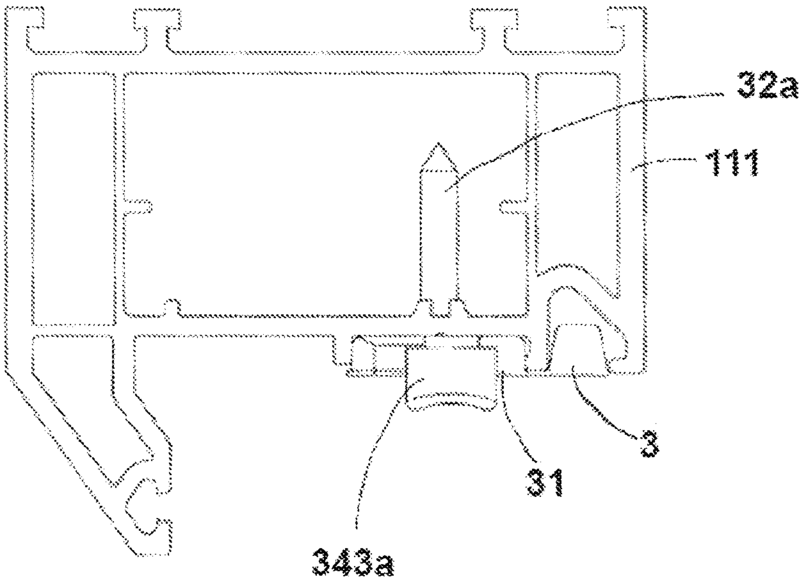
FIG. 10 is a cross-section through a frame member with a securing member attached.
Figure 11:
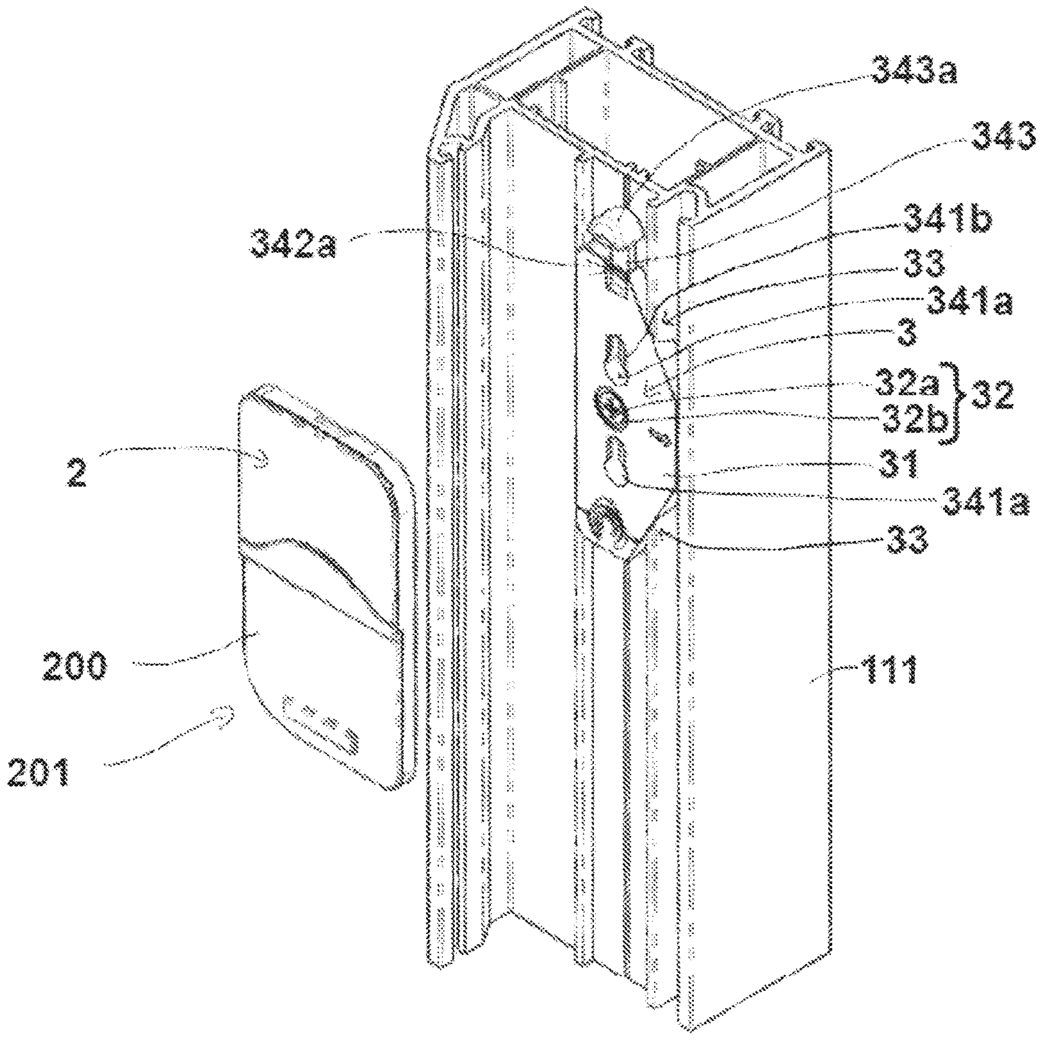
FIG. 11 shows a module and securing member, with a section of frame member (as part of an initial step of fitting the module)
Figure 12:
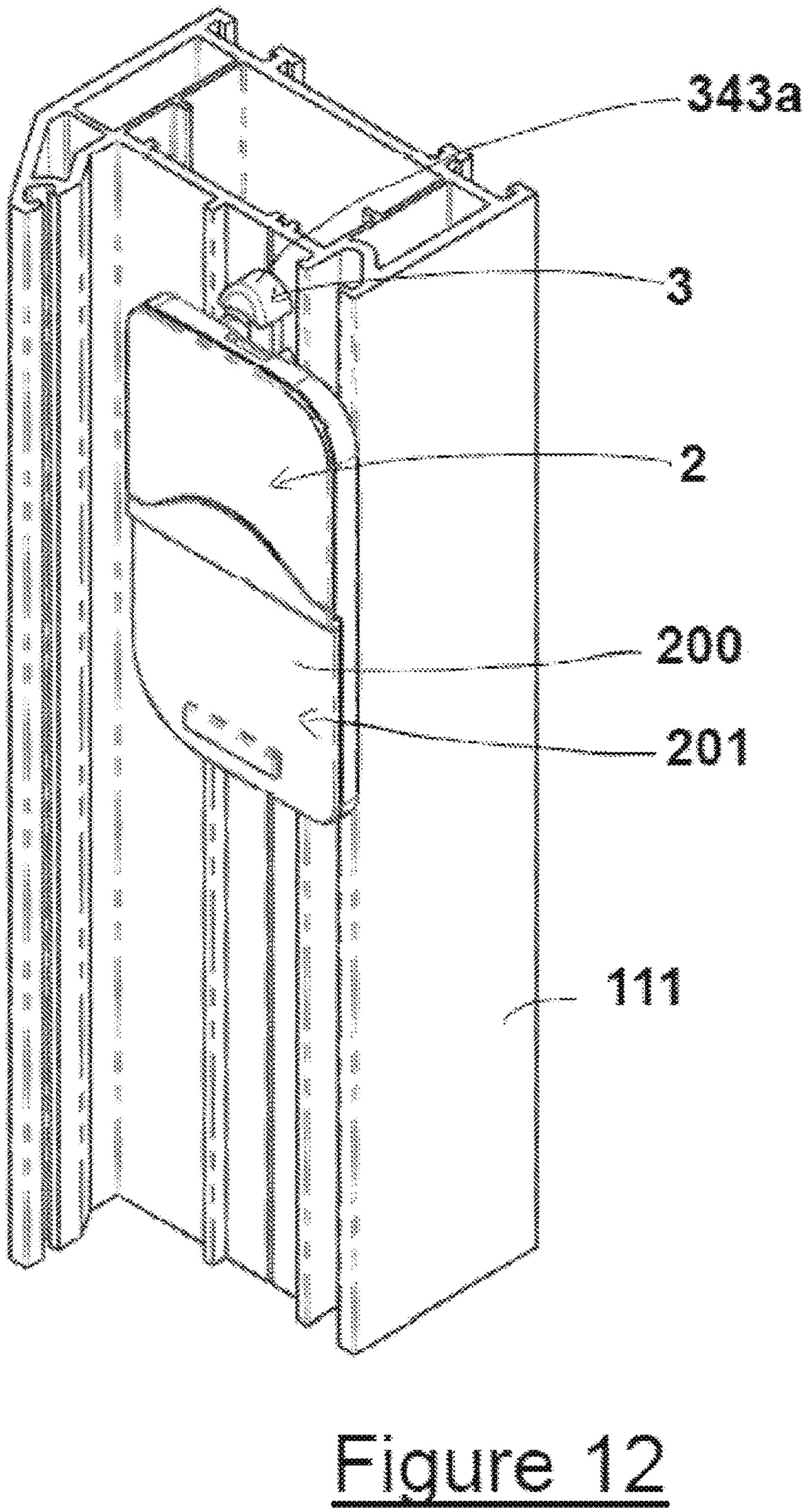
FIG. 12 shows a module and securing member, with a section of frame member (as part of an intermediate step of fitting the module)
Figure 13:
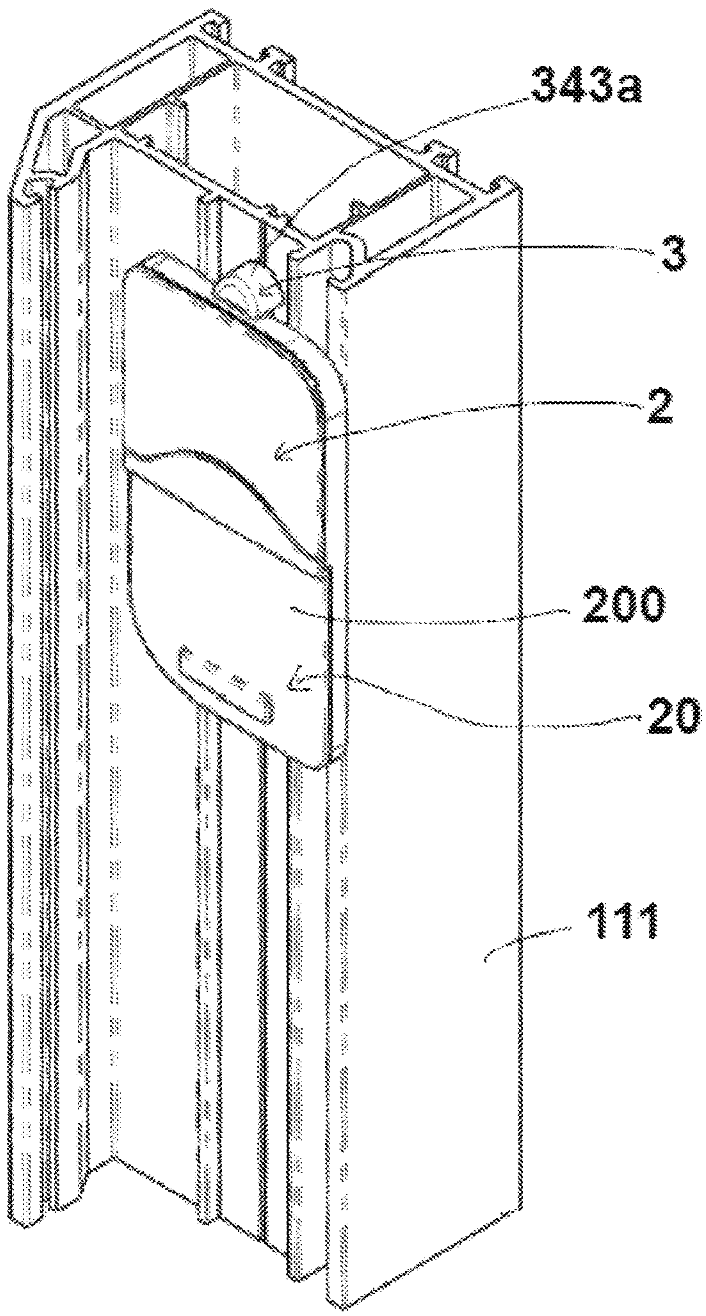
FIG. 13 shows a module and securing member, with a section of frame member (with the module fitted to the securing member)
Figure 14:
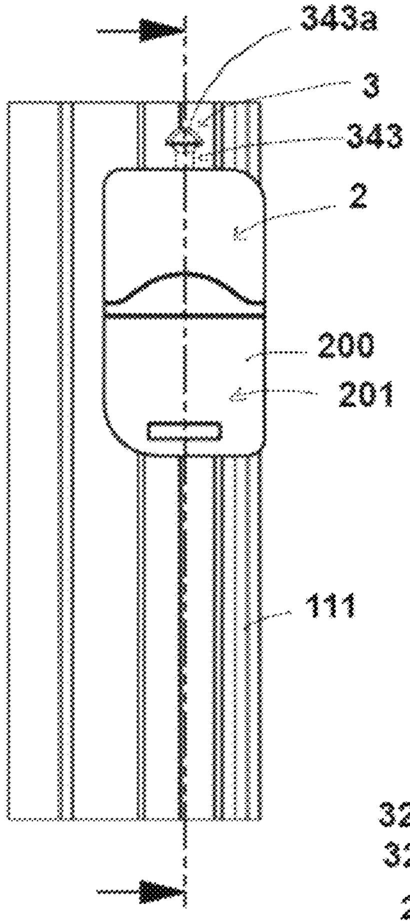
FIG. 14 shows view of a section of a frame member including a securing member and a module (in the intermediate step of fitting of the module)
Figure 16:
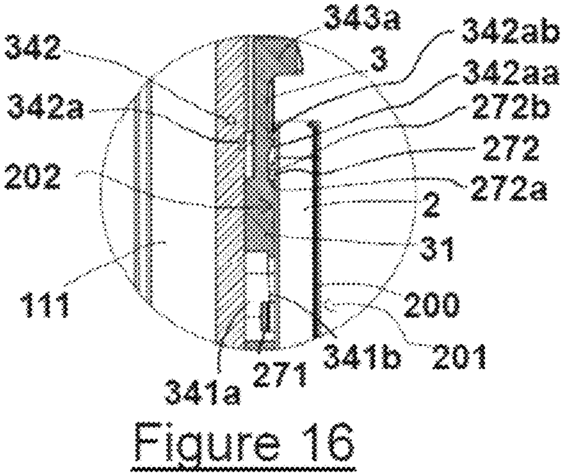
FIG. 16 is a detail view of the part indicated in FIG. 15.
Figure 15:
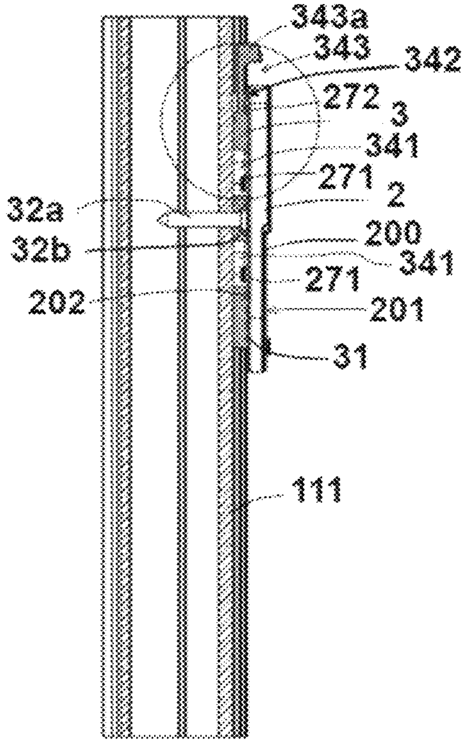
FIG. 15 shows a cross-section view of a section of a frame member including a securing member and module (through the section line indicated in FIG. 14)
Figure 17:
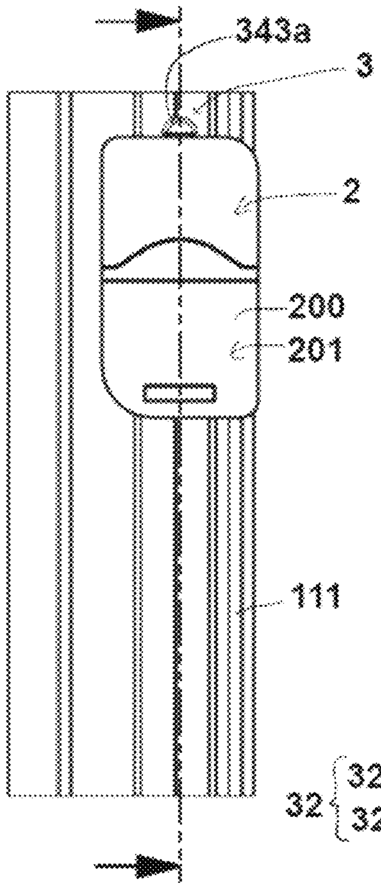
FIG. 17 shows view of a section of a frame member including a securing member and a module (with the module fitted to the securing member)
Figure 19:
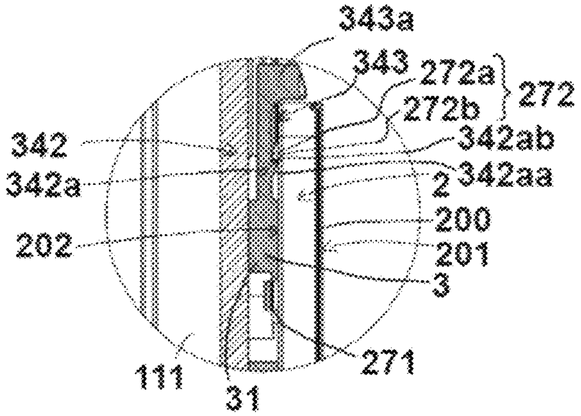
FIG. 19 is a detail view of the part indicated in FIG. 18.
Figure 18:
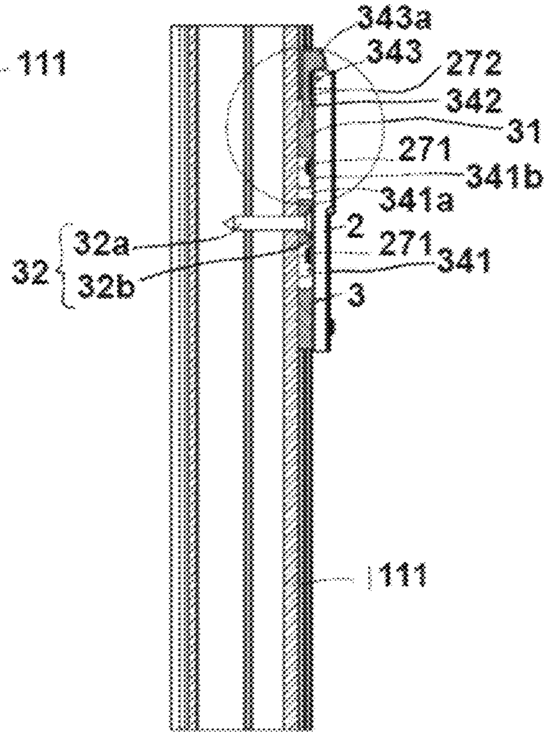
FIG. 18 shows a cross-section view of a section of a frame member including a securing member and module (through the section line indicated in FIG. 17)
Figure 20:
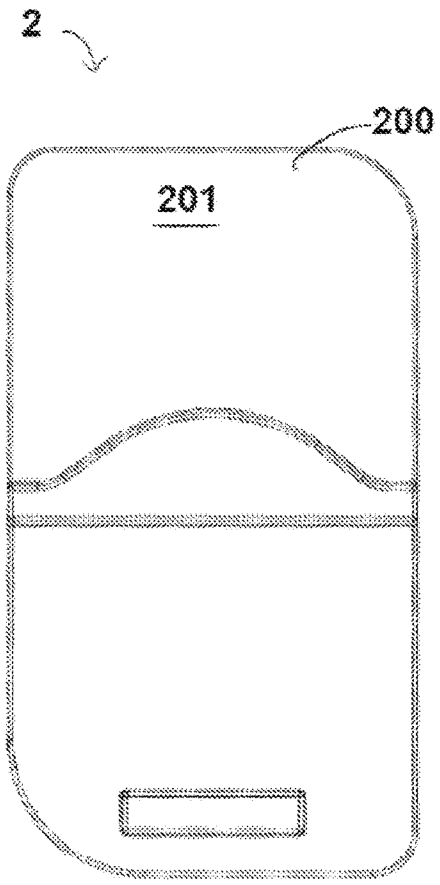
FIG. 20 shows a front/outer view of a module.
Figure 21:
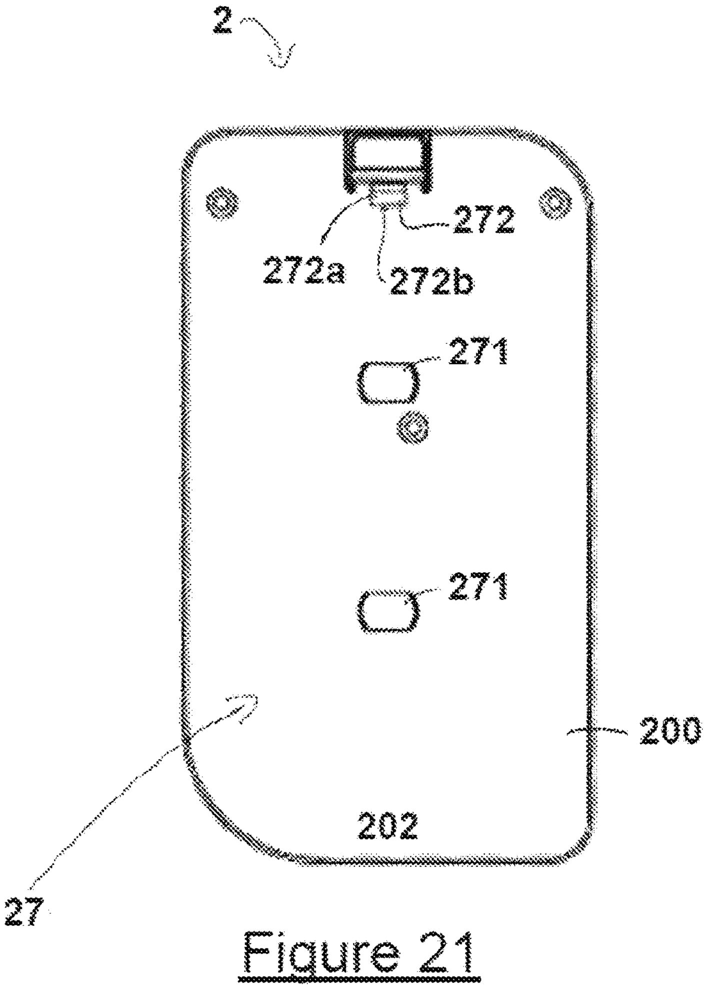
FIG. 21 shows a rear/inner view of a module.
Figure 22:
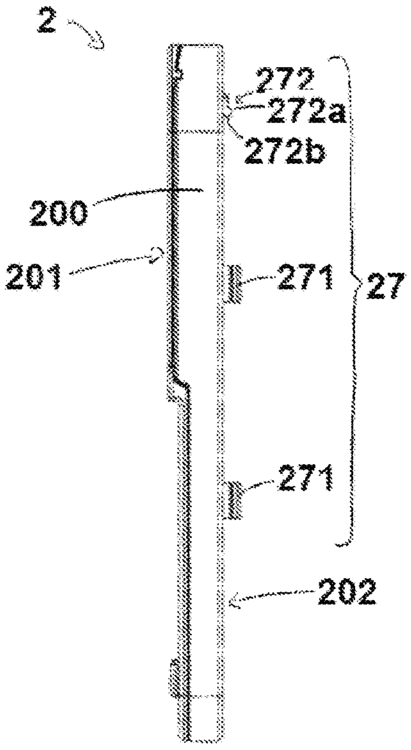
FIG. 22 shows a side view of a module.
Figure 23:
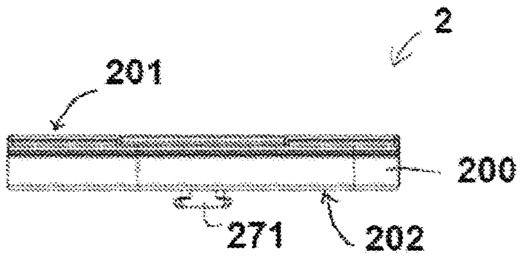
FIG. 23 shows a bottom view of a module.
Figure 24:
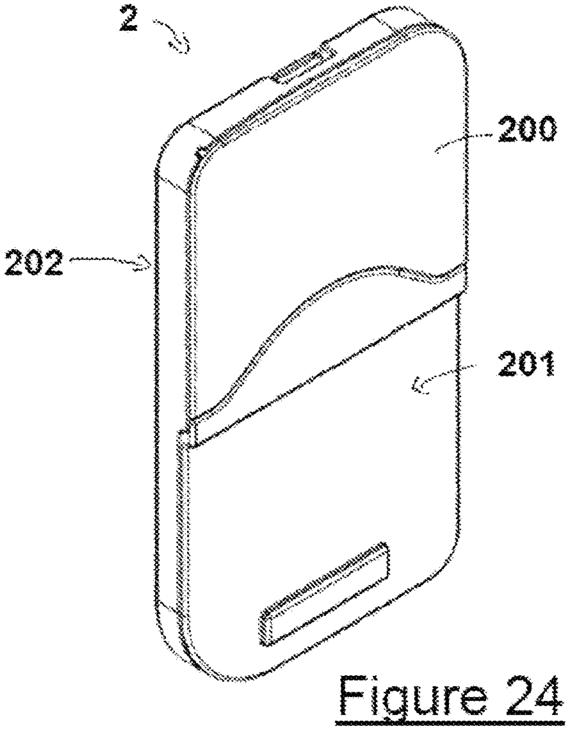
FIG. 24 shows a perspective front/outer view of a module.
Figure 25:
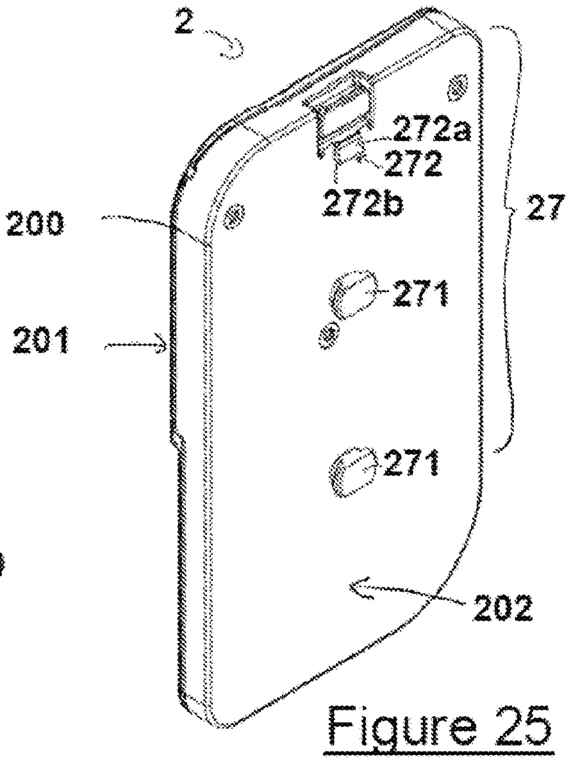
FIG. 25 shows a perspective rear/inner view of a module.
Figure 26:
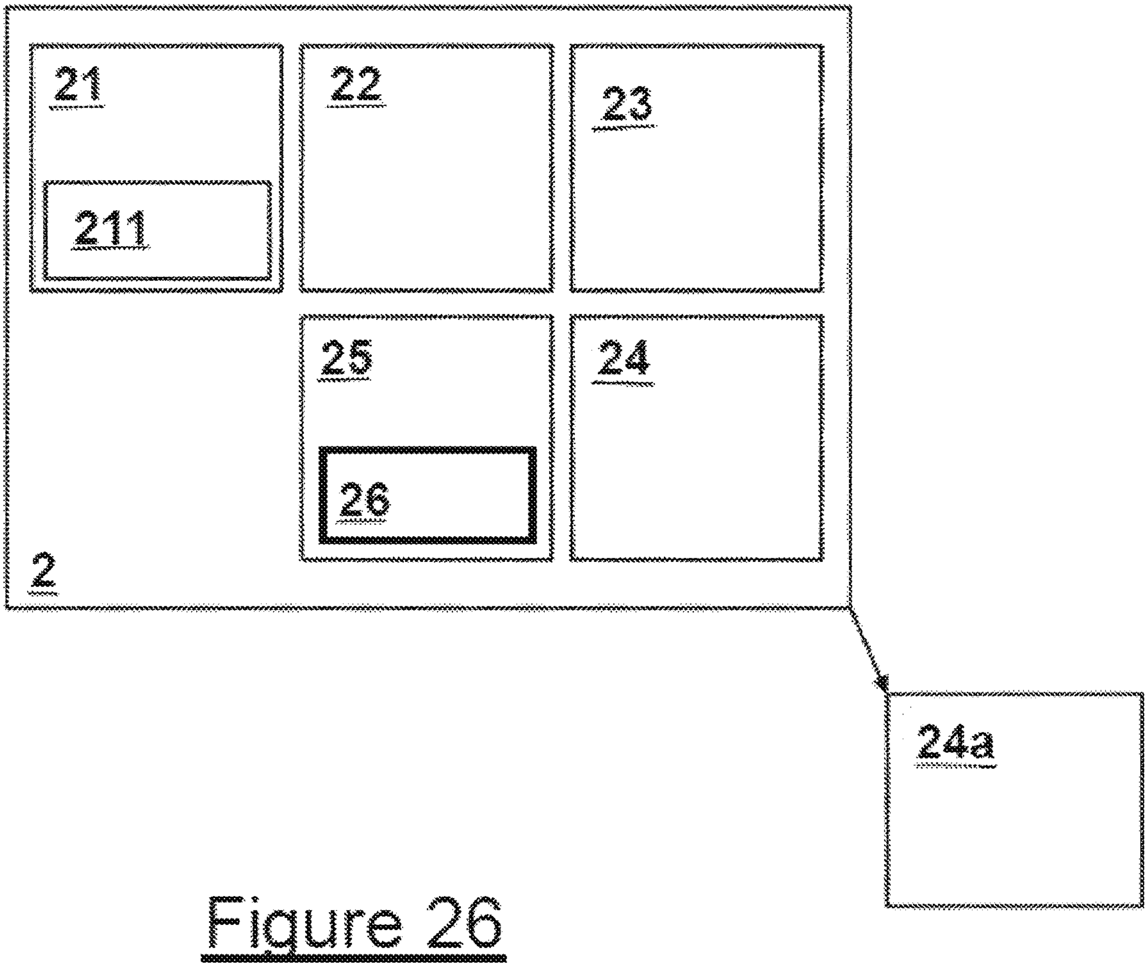
Figure 27:
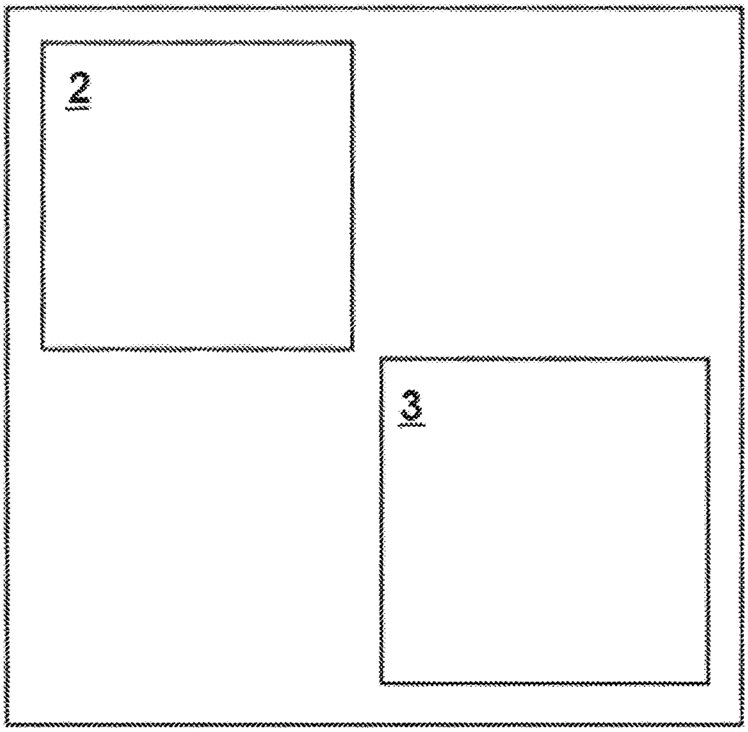
Figure 28:
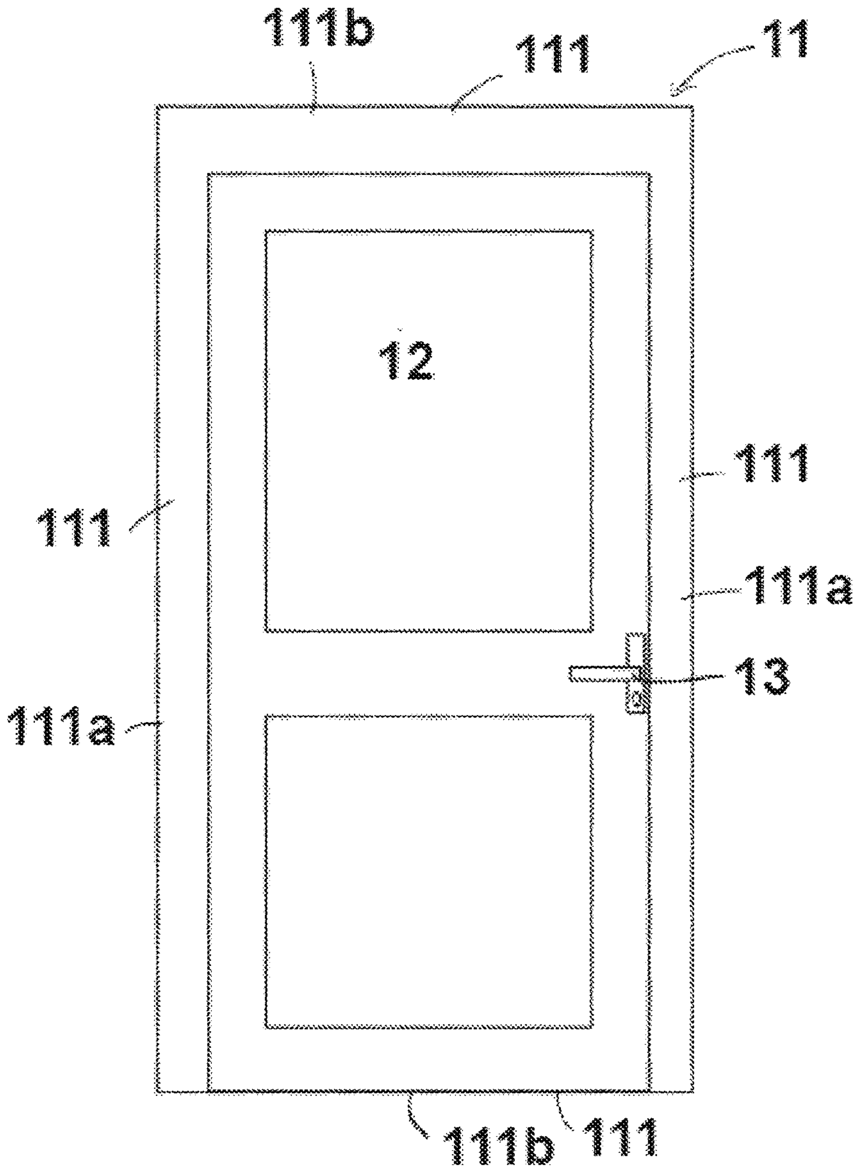
Figure 29:
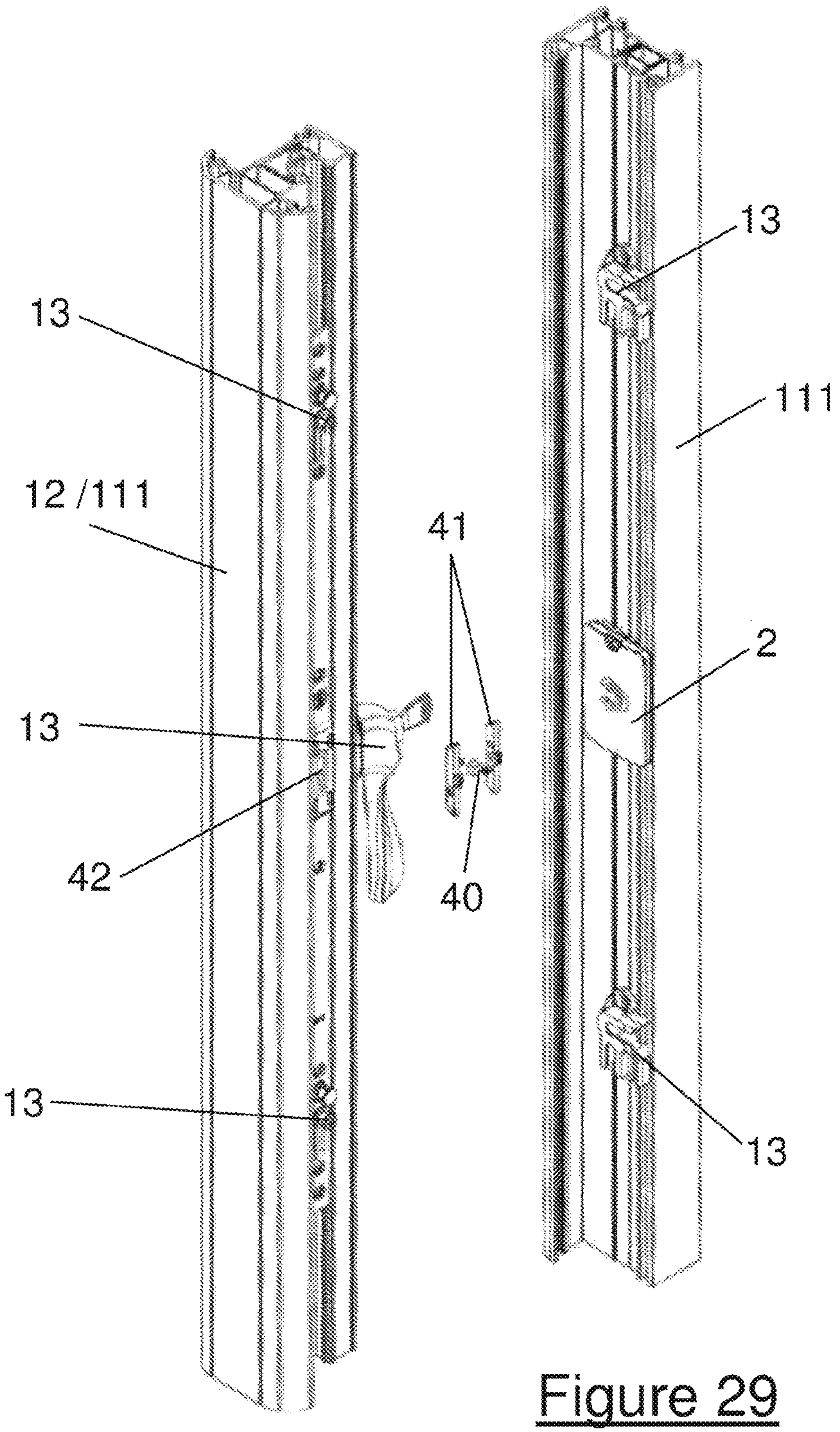
Figure 30:
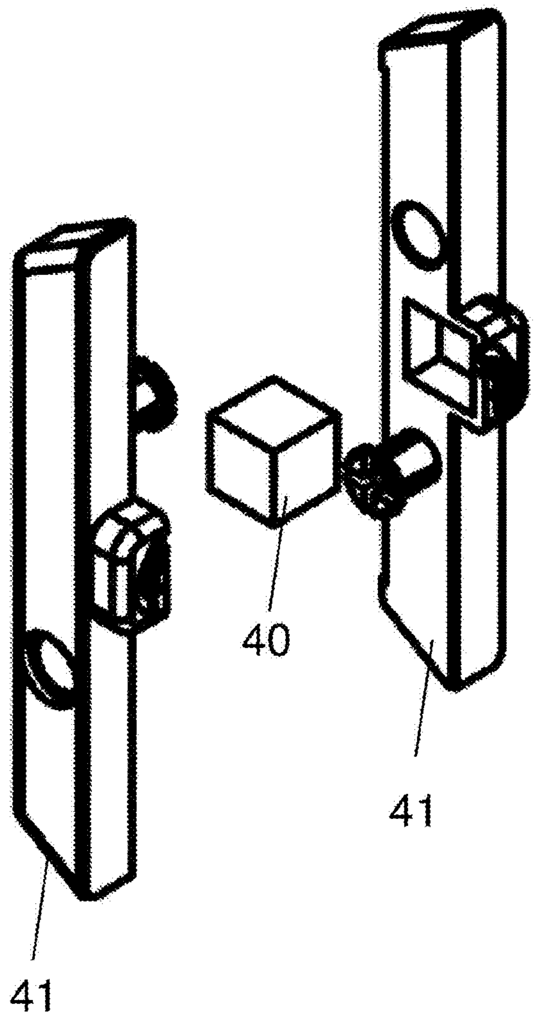
Figure 31:
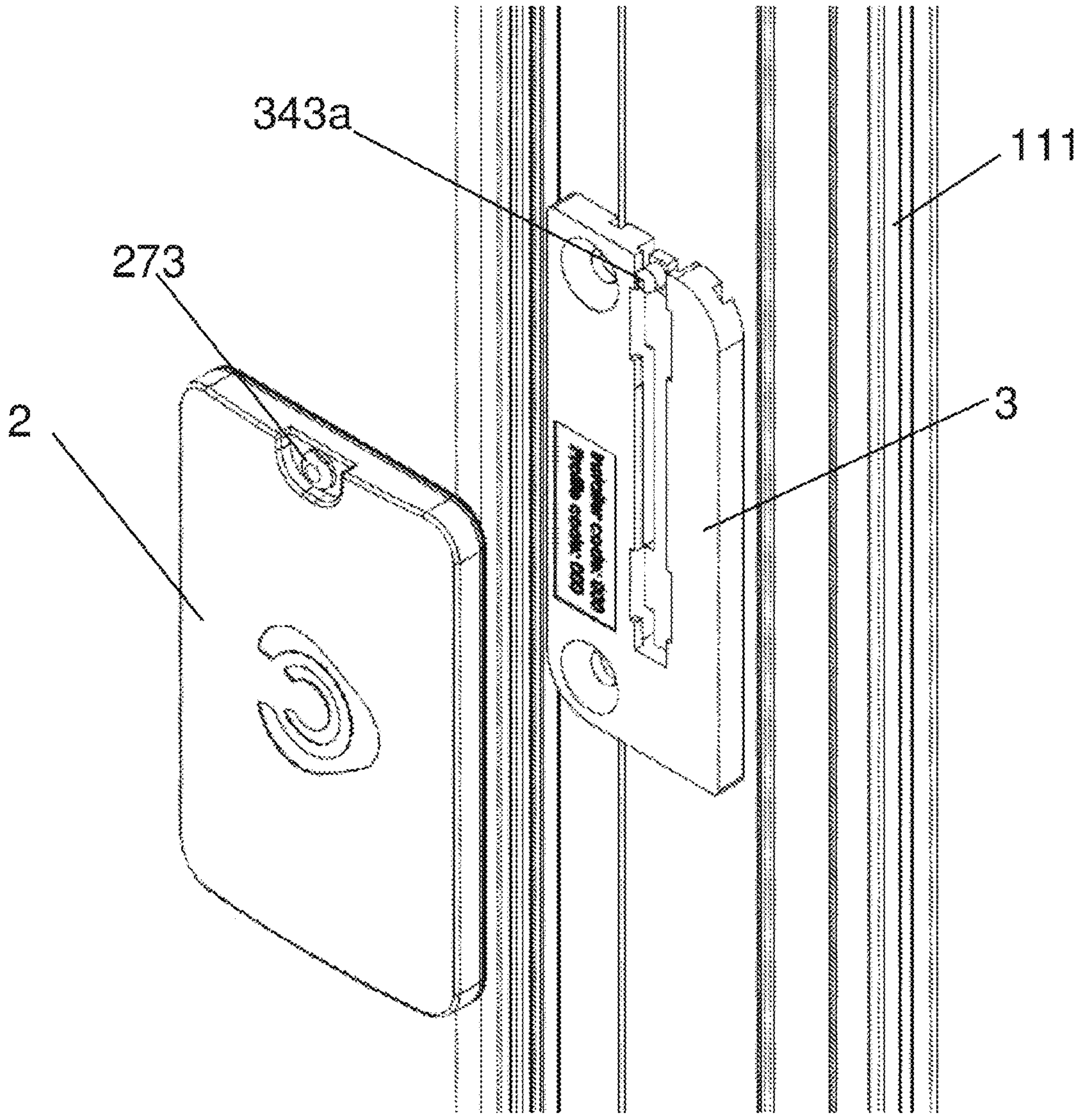
Figure 32:
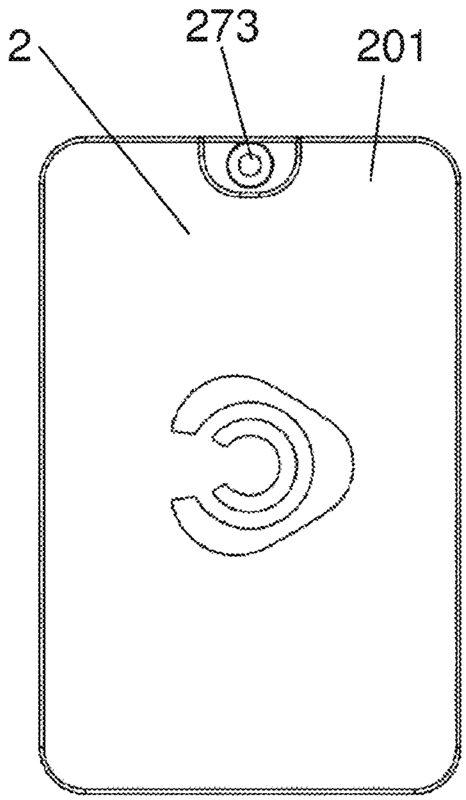
Figure 33:
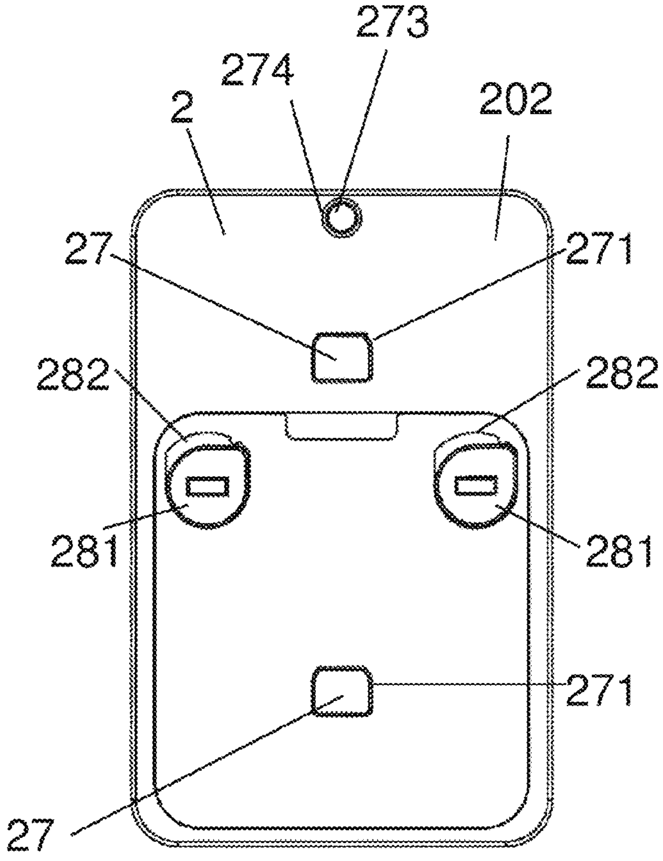
Figure 34:
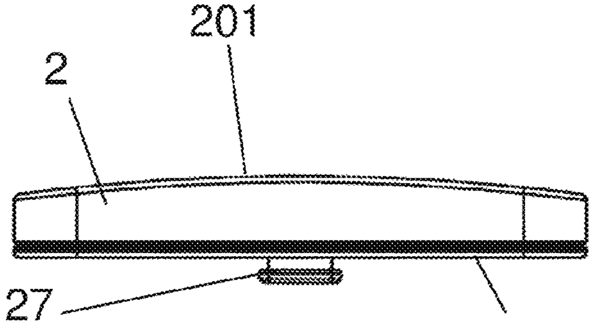
Figure 35:
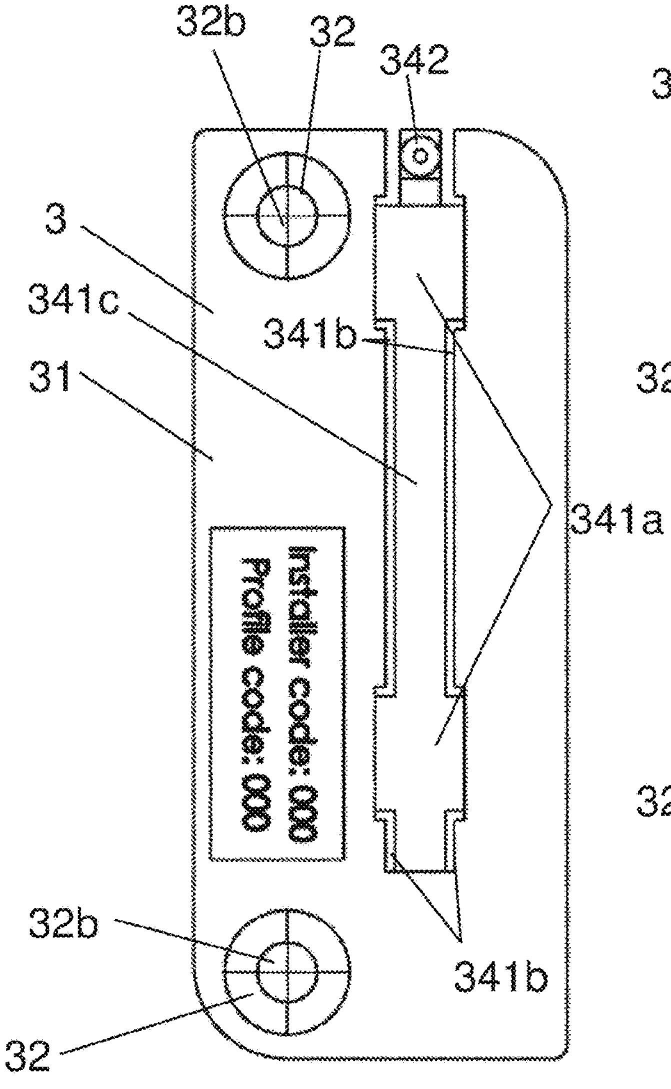
Figure 36:
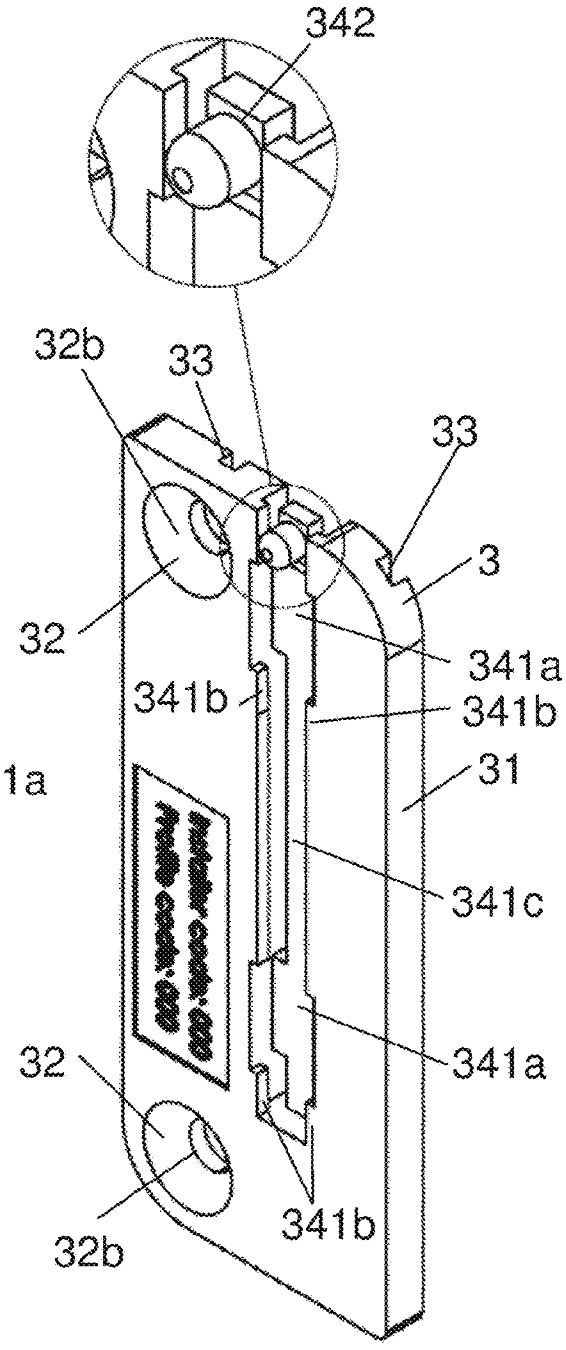
Figure 37A:
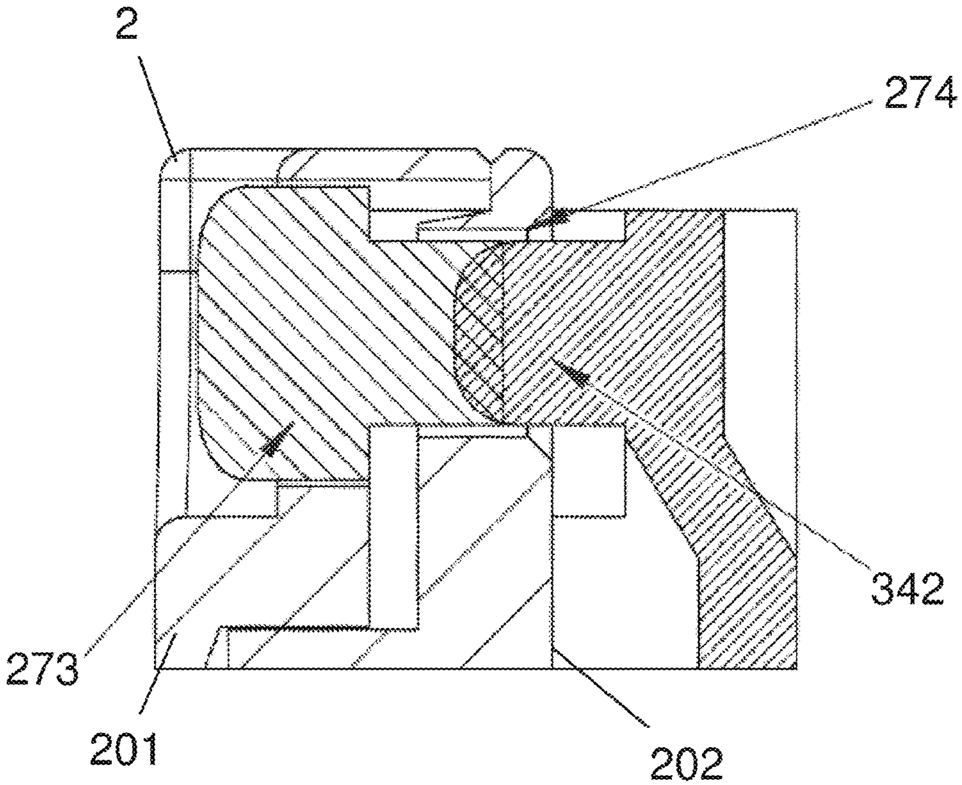
Figure 37B:
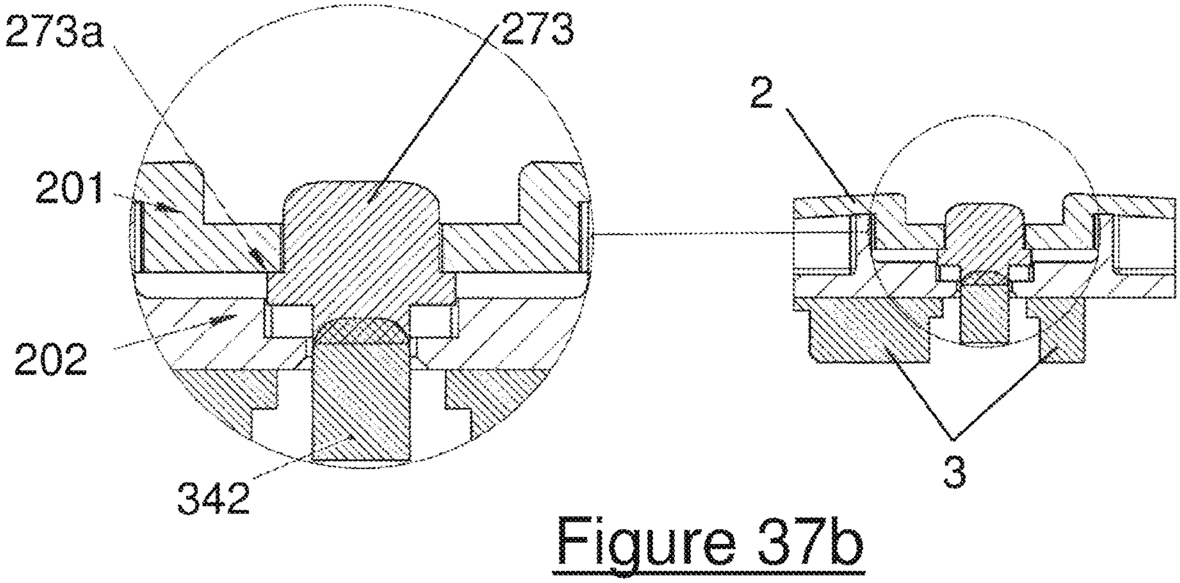
Figure 38:
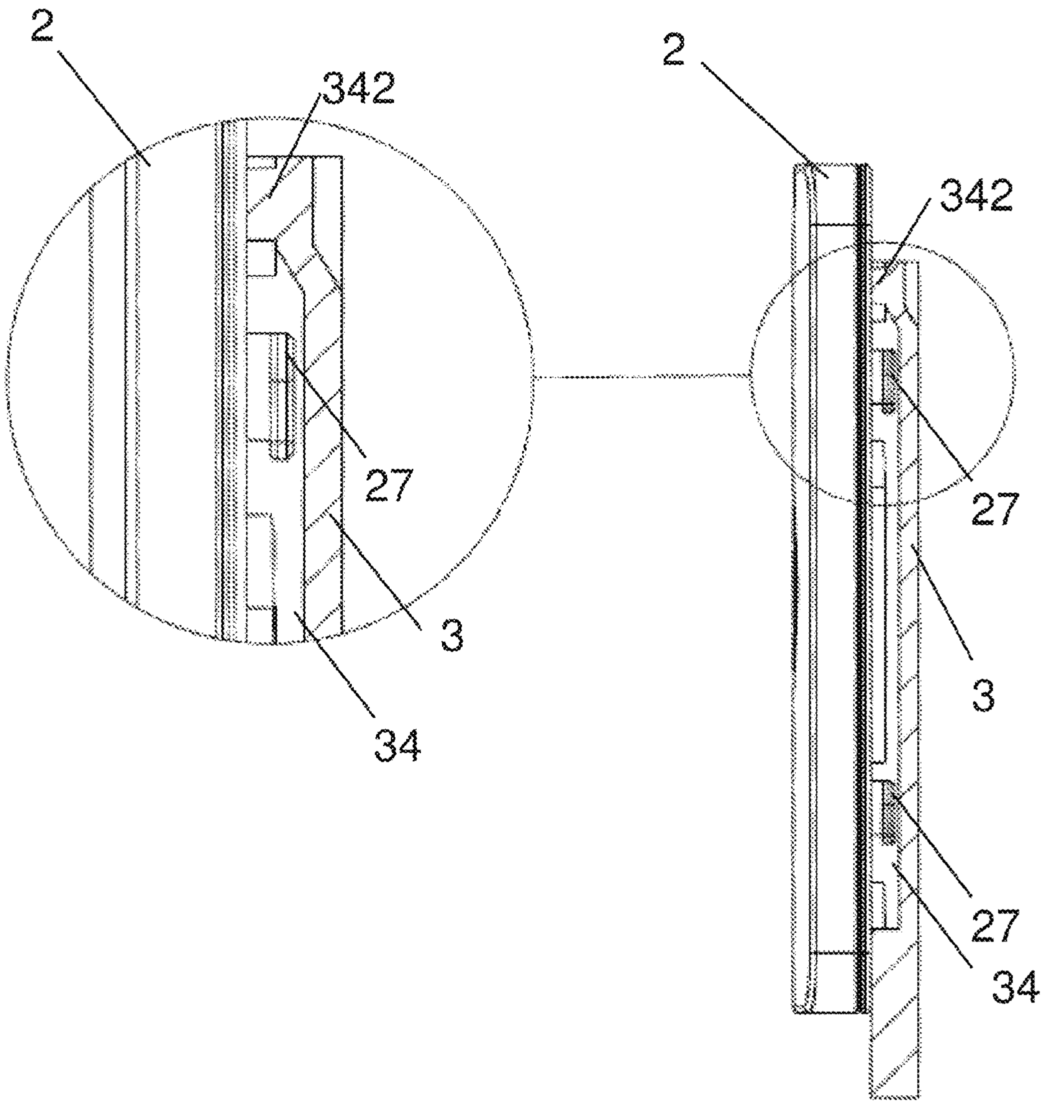
Figure 39:
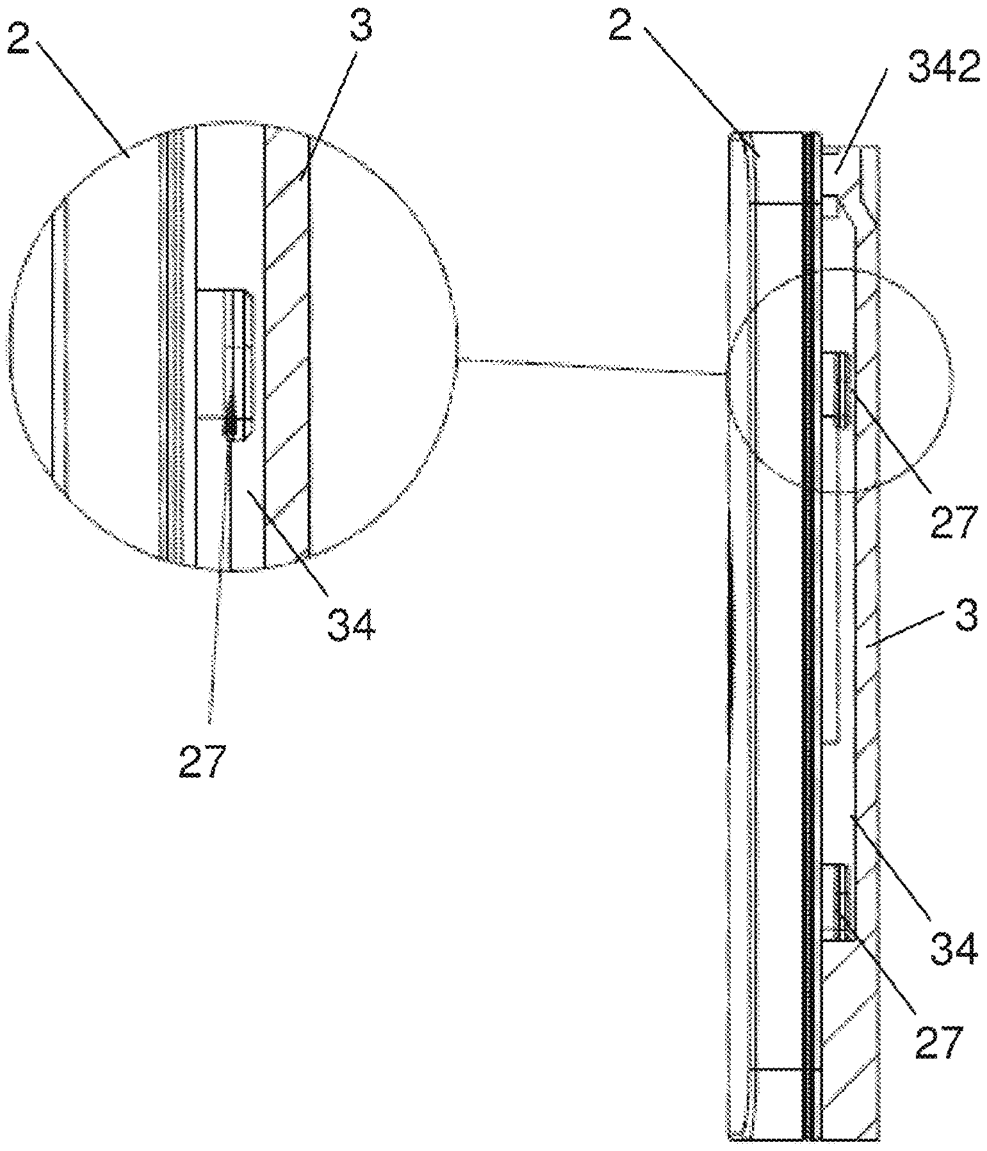
Figure 40:
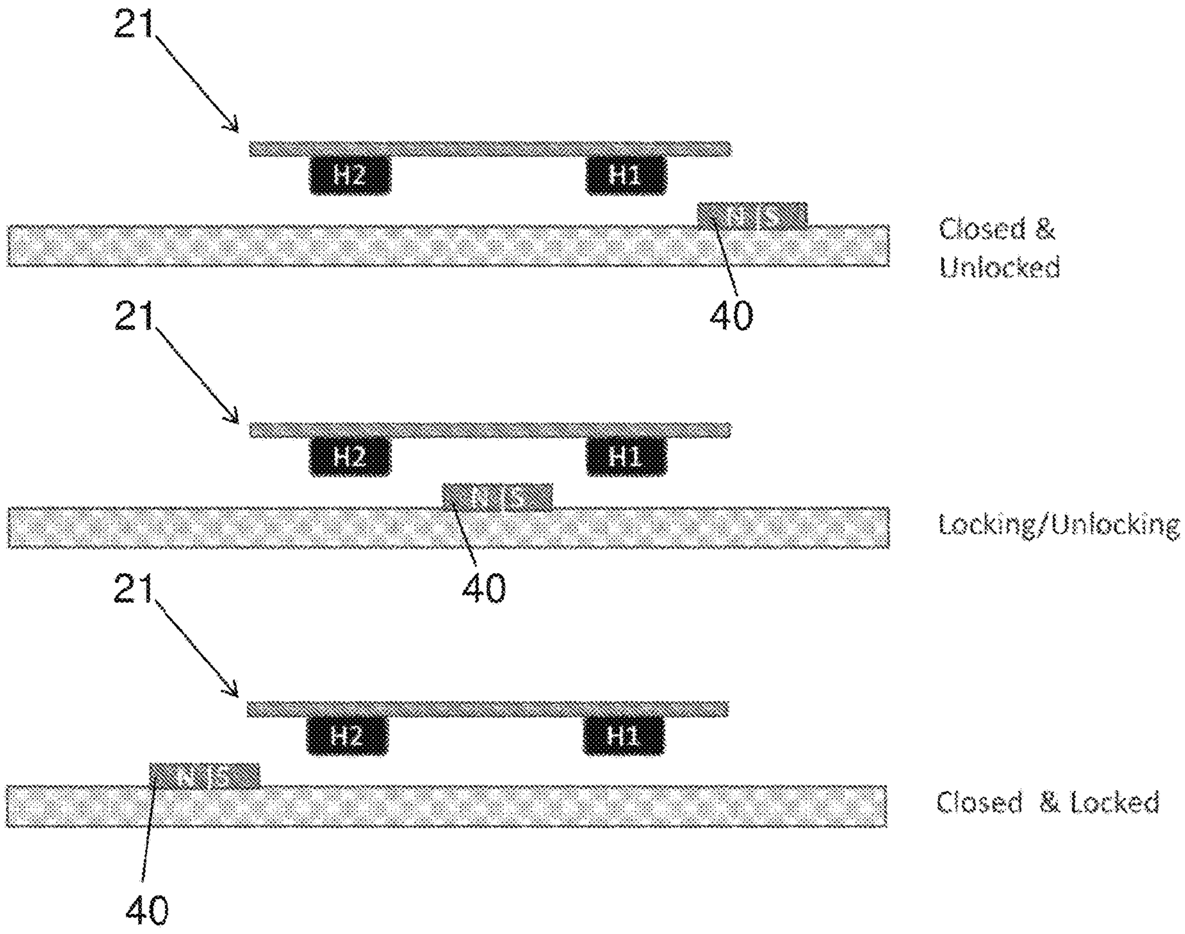
Figure 41:
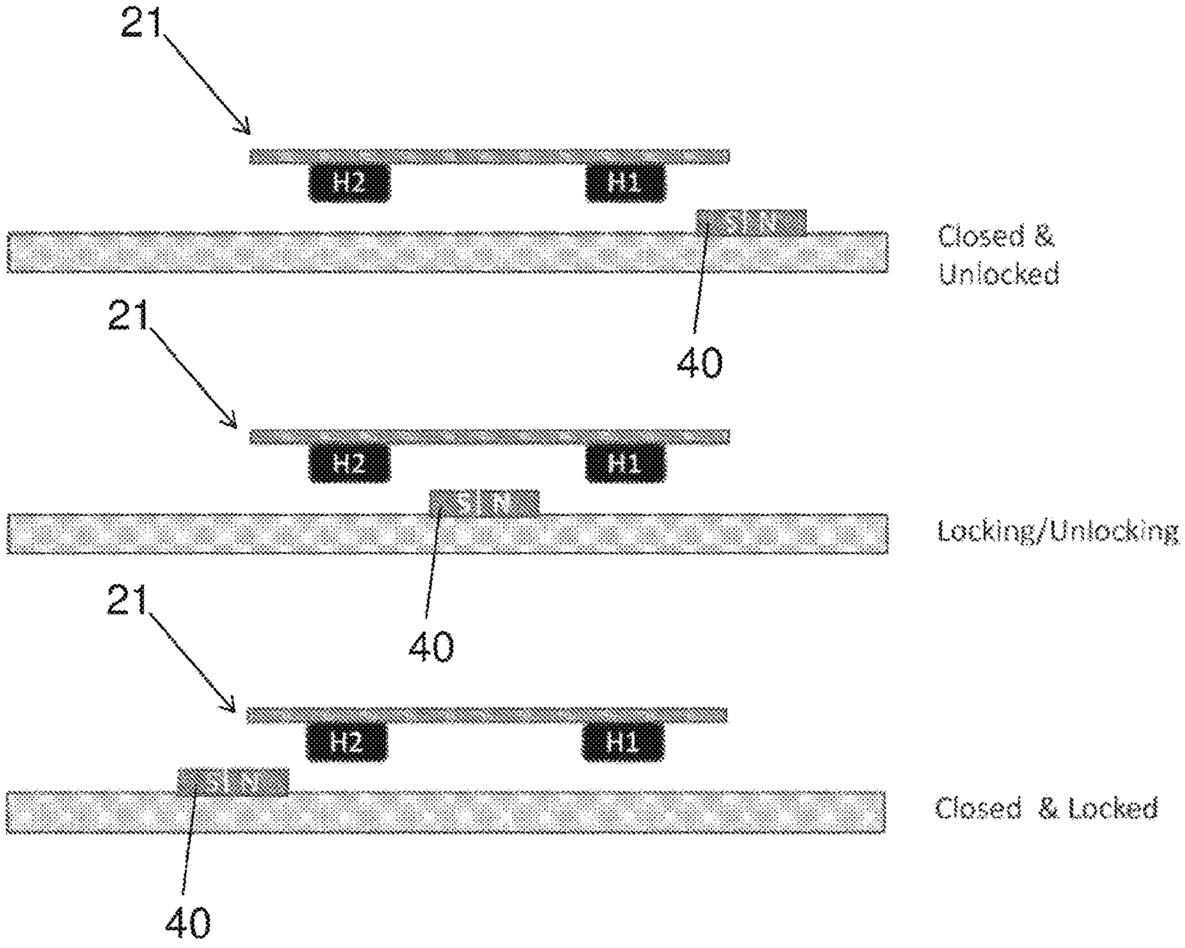
Figure 42:
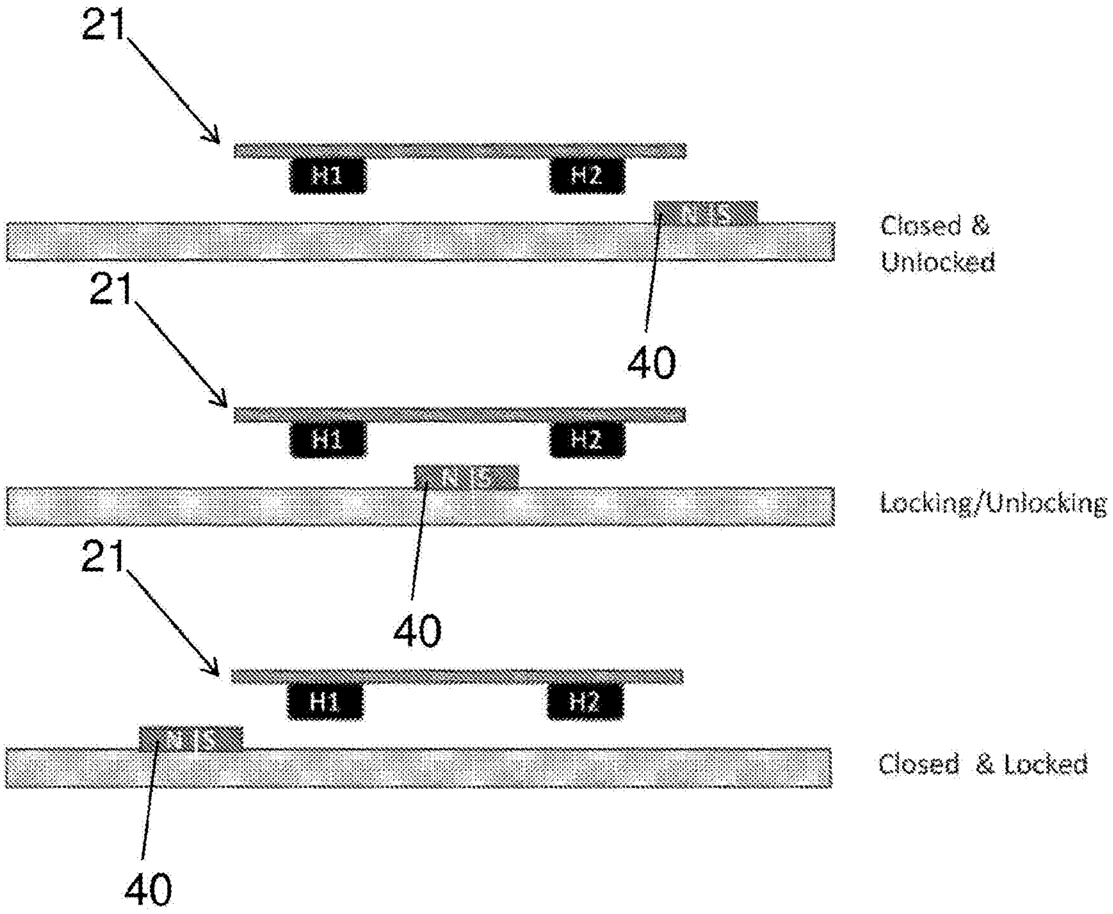
Figure 43:
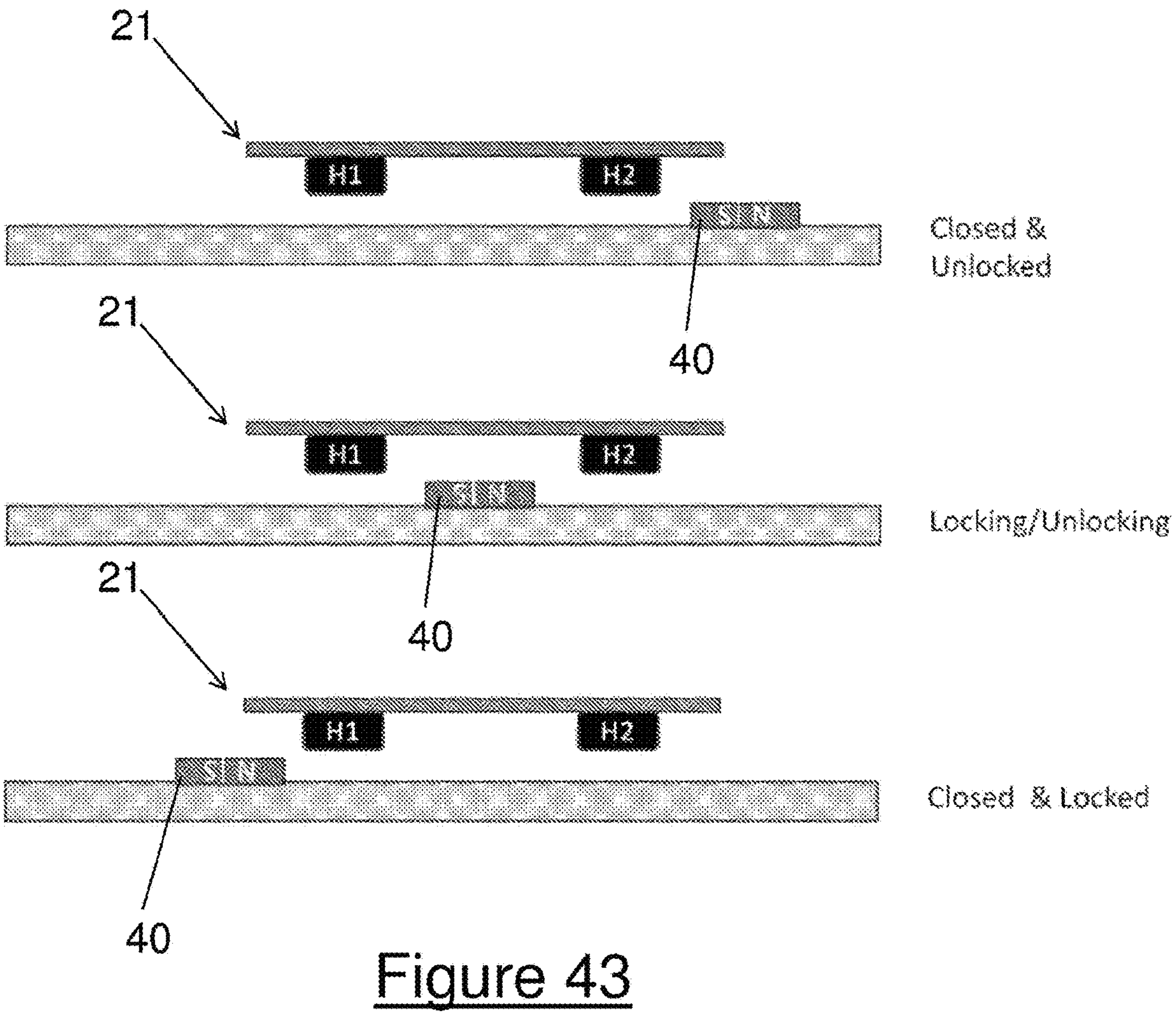

FIG. 26 schematically shows a module and hub;

FIG. 27 schematically shows an attachment system;

FIG. 28 shows a door;

FIG. 29 shows a module and a magnet, with a section of frame member;

FIG. 30 shows a magnet and magnet housing in an exploded view;

FIG. 31 shows a module and securing member, with a section of frame member (as part of an initial step of fitting the module);

FIG. 32 shows a front view of a module;

FIG. 33 shows a rear view of a module;

FIG. 34 shows an end view of a module;

FIGS. 35 and 36 show a securing member;

FIGS. 37*a* & 37*b* show partial cross-sections through a module and securing member;

FIG. 38 shows a cross-section through a module and securing member (as part of an intermediate step of fitting the module);

FIG. 39 shows a cross-section through a module and securing member, with a section of frame member (with the module fitted to the securing member);

FIG. 40 shows schematic view of a sensor and magnet arrangement;

FIG. 41 shows schematic view of a sensor and magnet arrangement;

FIG. 42 shows schematic view of a sensor and magnet arrangement;

FIG. 43 shows schematic view of a sensor and magnet arrangement;

FIG. 44 shows a state table associated with FIG. 40;

FIG. 45 shows a state table associated with FIG. 41;

FIG. 46 shows a state table associated with FIG. 42; and

FIG. 47 shows a state table associated with FIG. 43.

In accordance with embodiments, a door or window 1 may be provided (see FIG. 28, for example).

The door or window 1 may include a frame 11 and a moveable panel 12 (the moveable panel 12 being moveable with respect to at least part of the frame 11).

The frame 11 may include one or more frame members 111. The one or more frame members 111 may define an aperture of the door or window 1. In particular, the one or more frame members 111 may surround a perimeter of the aperture of the door or window 1. In some embodiments, the aperture is generally rectangular, or square, or circular (but may be any suitable shape). Each of the one or more frame members 111 may extend along a portion of the perimeter of the aperture of the door or window 1.

In the case of a rectangular aperture, the frame 11 may include a first pair of frame members 111*a*, each frame member 111 of the first pair 111*a* being arranged generally parallel to the other frame member 111 of the first pair 111*a*. The frame members 111 of the first pair 111*a* may be of substantially the same length and may be separated from each other across a width of the aperture. The length of the first pair of frame members 111*a* may define a height of the aperture. The frame 11 may include a second pair of frame members 111*b*, each frame member 111 of the second pair 111*b* being arranged generally parallel to the other frame member 111 of the second pair 111*b*. The frame members 111 of the second pair 111*b* may be of substantially the same length and may be separated from each other across a height of the aperture. The length of the second pair of frame members 111*b* may define a width of the aperture. The first pair of frame members 111*a* may be substantially perpendicular to the second pair of frame members 111*b*.

The panel 12 may be mounted to the frame 11 such that the panel 12 is rotatable with respect to at least one frame member 111 of the frame 11. In some embodiments, the panel 12 is mounted to the frame 11 using a hinge mechanism. In some embodiments, the panel 12 is mounted for rotation with respect to (and may be about an axis defined by) a one of the first pair of frame members 111*a* or a one of the second pair of frame members 111*b*.

Accordingly, the panel 12 may be moveable between open and closed conditions with respect to the frame 11 (e.g. by rotation with respect to at least one frame member 111). In the open condition, the door or window aperture is at least partially open such that passage through the aperture is permitted. In the closed condition, the door or window aperture is closed or substantially closed such that passage through the aperture is inhibited or substantially prevented. The passage may be of a person or an object, for example.

The door or window 1 may include a lock or latch mechanism 13 (which may be a lock and latch mechanism). The lock or latch mechanism 13 may be configured to be actuated between a locked condition and an unlocked condition. In the locked condition, with the panel 12 in the closed condition, the panel 12 is restricted or substantially prevented from moving to the open condition.

In the unlocked condition, the panel 12 may be permitted to move towards the open condition. The locked and unlocked conditions of the lock or latch mechanism 13, therefore, may correspond to locked and unlocked conditions of the door or window.

In some embodiments, the lock or latch mechanism 13 is a lock mechanism and a key may be required to actuate the lock mechanism between the locked and unlocked conditions. In some embodiments, the lock or latch mechanism 13 is a latch mechanism and a handle may be provided (as part of the latch mechanism) which may actuate the latch mechanism between the locked (or latched) condition and the unlocked (or unlatched) condition—the latch mechanism may not require a key for such actuation. In some embodiments, the lock or latch mechanism 13 is a lock and latch mechanism such that the mechanism can be actuated between (i) a latched and locked condition, (ii) a latched and unlocked condition, and (ii) an unlocked and unlatched condition. Herein, unless otherwise stated, the reference to a locked condition may include a latched condition and the reference to a unlocked condition may include an unlatched condition (irrespective of whether this is also a reference to a locked and unlocked condition).

The lock or latch mechanism 13 could take a number of different forms. For example, the lock or latch mechanism 13 may include at least one first member moveable with respect to a second member between the unlocked/unlatched and locked/latched conditions. The first member may be a bolt and the second member may be a keep. In some embodiments, the first member is mounted on a locking bar (e.g. rail) and may be in the form of a pin, whilst the second member may be a receiver for the pin (to receive and retain the pin). The first member may be mounted to the panel 12 and the second member may be mounted to the frame 11 or vice versa. Other lock or latch mechanisms 13 are envisaged but will generally include a first member which moves with respect to a second member, which then receives the first member in the locked condition and releases the first member in the unlocked condition.

In some embodiments, at least part of the frame (such as a frame member 111) is, in fact, part of another moveable panel 12 (e.g. in a multi-door arrangement)—the aperture of the door or window 1 being defined by another frame 11, for example. In such embodiments, the first member may be mounted to a first panel and the second member to a second panel (the two panels being general adjacent each other when in the closed conditions).

In some embodiments, the frame member 111 is part of the moveable panel 12 and moves therewith. In such embodiments a further frame 11 may be provided to define the aperture of the door or window 1.

In other words, the frame member 111 may be part of the frame 11 defining the aperture or may be part of the panel 12.

Although panels 12 which rotate with respect to at least part of the frame 11 have been described above and elsewhere herein, some embodiments may include at least one panel 12 which is configured to slide linearly with respect to at least part of the frame 11 (or another panel 12—so providing two panels 12 slideable with respect to each other, in some embodiments).

Embodiments include a module 2 (see FIGS. 11-27 & 29-34, for example). The module 2 is configured to be coupled to the frame member 111 of the door or window 1, or to the panel 12. The module 2 may house electrical or mechanical components.

The module 2 may be provided to allow sensing of the condition of the door or window 1. The module 2 may, therefore, be configured to sense a condition of the door or window 1.

The module 2 includes (and may house) a sensor 21. The sensor 21 may be configured to sense the condition of the door or window 1. For example, the sensor 21 may be configured to sense the position of the door or window panel 12 with respect to the frame 11 (for example, with respect to a frame member 111 or of the frame member 111 with respect to the frame 11 in embodiments in which the frame member 111 is part of the panel 12). The sensor 21 may also or alternatively be configured to sense the condition of the latch or lock mechanism 13.

For example, the sensor 21 may be in the form of or include a reed switch or a Hall Effect sensor (or a plurality of Hall Effect sensors H1, H2 see FIGS. 40-43). A magnet 40 may be provided—see FIGS. 29 and 30, for example.

The magnet 40 may be provided in a magnet housing 41—see FIG. 30 for example. The magnet housing 41 may include two parts which are configured to be secured to each other and within which the magnet 40 may be provided. A first part of the magnet housing 41 may be secured to a second part of the magnet housing 41 by one or more securing members which may be in the form of a screw or clip, for example. In some embodiments, the first and second parts of the magnet housing 41 are additionally or alternatively adhered together. In some embodiments, such as depicted in FIG. 30, for example, each of the first and second parts of the magnet housing 41 includes a mushroom-shaped member which is configured to be received by an aperture defined in the other of the first and second parts, in order to secure to the two parts together. The two parts may each define at least part of a magnet receiving recess such that, with the two parts secured to each other, the magnet 40 may be received within the magnet recess to retain the magnet in the magnet housing 41.

The magnet housing 41 may have an external cross-sectional shape which is keyed or at least partially keyed to a magnet attachment point 42—which may be in the form of an aperture of recess. The keyed or partially keyed arrangement may be such that the magnet 40 has a predefined orientation with respect to the magnet attachment point 42, or may have one of two predefined orientations with respect to the magnet attachment point 42.

As will be appreciated, the magnet 40 has two opposing poles, a north pole and a south pole—and an orientation of the magnet 40 may be understood to be defined by virtue of the north and south pole of the magnet 40.

With the module 2 mounted to the frame 11, the magnet 40 may be mounted to the panel 12, or vice versa. The mounting may be via the magnet attachment point 42. The magnet attachment point 42 may include an aperture or other recess formed in the panel 12, or frame 11. The mounting of the magnet 40 to the panel 12 or frame 11 (e.g. by use of the magnet attachment point 42 and/or the magnet housing 41) may be such that the an axis of movement of first member with respect to the second member may be generally aligned with a magnetic axis of the magnet 40 (i.e. the magnetic axis is directionally aligned with the magnet path, which may mean that it is parallel thereto, for example). For example, in relation to FIG. 29 (for instance), there may be a locking bar (or rail) provided and the magnet 40 may be mounted thereto such that movement of the locking bar is along an axis which is parallel to the magnet axis of the magnet 40. In FIG. 29, this happens to a vertical axis. The magnet attachment point 42 may be an elongate slot and the magnet housing 42 may also, therefore, be elongate. The magnet 40 may be held in place by virtue of magnetic attraction, a mechanical clip, a screw, a rivet, and/or an adhesive, for example.

The magnet 40 may be located such that, with the door or window 1 in the closed condition, the sensor 21 (e.g. the reed switch) is actuated to an "on" state but with the door or window 1 in the open condition, the reed switch is in an "off" state. The magnet 40 may be mounted for movement with the first member (of the lock or latch mechanism 13) such that, with the door or window 1 in the locked condition, the sensor 21 (e.g. reed switch) is actuated to an "on" state but with the door or window 1 in the unlocked condition, the sensor 21 (e.g. the reed switch) is in an "off" state.

In some embodiments, the sensor 21 may be a mechanical switch rather than a reed switch, for example. The mechanical switch may be actuated between on and off states by physical contact, for example. The mechanical switch may be a micro-switch.

As described, in some embodiments, the sensor 21 may include at least one Hall Effect sensor H1,H2 and, in some embodiments, may include at least two Hall Effect sensors H1,H2. The operation of some such embodiments is discussed herein with reference to FIGS. 40-43, for example.

The sensor 21 may be a motion or proximity sensor which does not require physical contact for actuation—a reed switch or a Hall Effect sensor being one example of such a sensor 21 another example being an induction coil, for example.

For the correct operation of the sensor 21, the module 2 may therefore need to be located on the frame 11 or panel 12 in close proximity to the other of the frame 11 or panel 12 when the window or door 1 is in the closed condition and/or in close proximity to the lock or latch mechanism 13 (e.g. when in the locked condition). The module 2 must not, however, foul the operation of the door or window 1, or the lock or latch mechanism 13. The spacing of the module 2 with respect to the frame member 111 may, therefore, be important.

The module 2 may include (and may house) a power source 22, for powering powered elements of the module 2, or may include a connection (for example, a port or other socket to allow connection of a cable) for connecting the module 2 to a power source 22. For example, the module 2 may be connectable to a mains electrical power supply. In some embodiments, the power source 22 is in the form of a battery. The battery may be a rechargeable battery and the power source may include a connection (such as a port or other socket) to enable recharging of the battery. In some embodiments, the battery is not rechargeable. In some embodiments, the battery is replaceable such that the battery is removable from the module 2 and can be replaced without substantive damage to the module 2. In some embodiments, the battery is not replaceable—such that the module 2 may be a so-called sealed unit—and removal of the battery from the module 2 may, therefore, damage to the module 2 or may require specialist tools.

An example module 2 with a replaceable battery is shown in FIG. 33 (in relation to which FIGS. 32 and 34 may be of the same module 2). In relation to the module 2 of FIG. 33 and some other embodiments, the module may include a battery cover 28. The battery cover 28 may be configured to be at least partially removed from the rest of the module 2 to allow access to a battery for replacement. Access may also be provided, via the movement of the battery cover 28 for maintenance, for example. The battery cover 28 may be hinged (e.g. along a first edge (which is generally the lower edge as depicted in FIG. 33)). The battery cover 28 may be removable such that it is detached from the rest of the module 2 for example. In some embodiments, the battery cover 28 is held in place (i.e. in a closed configuration) with respect to the rest of the module 2 by one or more cam members 281 of a cover securing mechanism. The or each cam member 281 may be rotatably coupled to the module 2 (for rotation with respect to the battery cover 28. The or each cam member 281 may be configured to rotate between a respective unlatch and latched position. With the or each cam member 281 in its unlatched position, the or each cam member 281 may be configured to pass through a respective aperture 282 defined through the battery cover 28. This enables the battery cover 28 to be placed into the closed configuration. The or each cam member 281 may then be rotated such that at least part of the or each cam member 281 engages a part of the battery cover 28 to inhibit its removal (i.e. to inhibit its movement out of the closed configuration into an open configuration). The or each cam member 281 may include a slot for use in rotating that cam member 281 (e.g. through engagement with a screw driver or coin). The or each aperture 282 for receiving the cam member(s) 281 may be located towards a second edge of the battery cover 28 which may oppose the first edge across a length thereof. The first edge, if not coupled to the rest of the module 2 by a hinge, may be coupled to the rest of the module by virtue of one or more tags thereof being received in respective recess(es) of the rest of the module 2 or behind an outer wall of the rest of the module 2.

The module 2 may include (and may house) a controller 23, for example to control operation of the sensor 21 and/or to receive information from the sensor 21. The module 2 may include a processor 25, configured to process sensed information from the sensor 21. In some embodiments, the controller 23 is provided as part of the processor 25 and/or is the processor 25.

The module 2 may include (and may house) a communications subsystem 24. The communications setup 24 may be configured to communicate with another device and that communication may be wireless communication or may be over a wired communication channel or both. The communications subsystem 24 may include a transmitter and/or a receiver, or only a transceiver (i.e. without a receiver). The communication subsystem 24 may be configured to communicate with another device using radio frequency waves—for example, using WiFi® or Zigbee® or Bluetooth®, or a similar radio frequency protocol.

The communication subsystem 24 may be operated by the controller/processor 23/25 and may be powered by the power source 22.

The communications subsystem 24 may be configured to deliver information about the condition of the door or window 1 (as sensed by the sensor 21) to a hub 24*a*. The hub 24*a* may be configured to collect and/or forward the received information to yet another device (such as a server, for example). The hub 24*a* may, therefore, provide an interface between the communication channel used to communicate with the module 2 (which may be relatively short range communication and may be a local area network) and the communication channel used to communicate with the yet another device (which may be relatively long range communication and may be a wide area network such as the Internet).

In some embodiments, a user may use a computing device (such as a mobile telephone, laptop, desktop, tablet, or the like) to interrogate the hub 24*a* and/or the yet another device to obtain information about the condition of the door or window 1. The computing device may be configured to receive this information and to present an indication to the user about the current condition of the door or window 1 (e.g. a visual indication about the state of the door or window 1 in substantially real-time and/or a historic record of changes in that state).

The communications subsystem 24 may be configured to deliver information about the condition of the door or window 1 to the hub 24*a* or another device periodically or on request from the hub 24*a* or other device.

Likewise, the hub 24*a* may be configured to deliver information about the condition of the door or window 1 to another device periodically or on request.

The module 2 may include (and may house) a computer readable medium 26 storing instructions which, when executed by the processor/controller 25/23 cause the performance of the operations of the module 2—such as the sensing of the condition of the door or window 1 and the transmission of that condition.

The module 2 may be a self-contained unit. The module 2 may be a sealed unit. The module 2 may include a housing 200 in which the various components thereof are located. The housing 200 may be sealed against the ingress of water. The housing 200 may be such that opening of the housing 200 to access the internal components of the module 2 may cause damage to the housing 200 or may require specialist tools.

In some embodiments, the housing 200 is a two-part housing including a main part and a lid part—the main and lid parts being configured to be coupled together to provide the housing 200. The lid part may be removably coupled to the main part. One or more fixing elements may be provided to enable to the main part and the lid part to the coupled to each other—such as one or more threaded members such as a screw (which may, as depicted for example, have a Torx® head or other suitable specialist alternative). The main part and the lid part may have correspondingly shaped mating edges and these edges may include one or more locating features (such as a protrusion and corresponding cut-out) in order to aid in fitting of the lid part to the main part.

The module 2 may include a front portion 201 which, when fitted as described herein, is generally visible to the user (when the door or window 1 is in the open condition) and may include a back portion 202 which may couple the module 2 to the frame 11 or panel 12. In some embodiments, the main part of the housing 200 provides the back portion 202 and the lid part provides the front portion 201.

The front portion 201 may be in the form of a fascia and/or may include one or more decorative elements.

The housing 200 may include a stepped feature such that a first part of the housing 200 has a first depth and a second part of the housing 200 has a second depth (the first depth being greater than the second depth). In some embodiments, the housing 200 is of a substantially uniform depth along its length (although the depth may taper towards the sides)—see FIGS. 32 and 34, for example.

In some embodiments, at least part of the sensor 21 may be positioned relatively closer to the front portion 201 than the back portion 202, and may, indeed, extend from the front portion 201 (in a direction away from both the front and back portions 201,202).

In some embodiments, the housing 200 may include a raised section (which may be raised from the first and/or second part of the housing 200) which may contain the sensor 21 or at least part thereof.

The stepped feature (and/or the raised section) may aid the user in the fitting of the module 2, as will be apparent from the description in this regard presented herein, by proving a means for better application of a manual force to the module 2.

The housing 200 may be generally rectangular (e.g. a rounded rectangle)—although other shapes are envisaged. One or more corners of the housing 200 may be rounded at a different radius than one or more other corners of the housing 200.

The module 2 may include a coupling arrangement 27 and this may be at least partially located on or as part of the back portion 202 of the housing 200 of the module 2.

In the depicted and some other embodiments, the coupling arrangement 27 includes one or more pins 271 which may extend from a main surface of the back portion 202 of the housing 200. The or each pin 271 may extend generally perpendicular to a plane of the back portion 202 of the housing 200. The or each pin 271 may be generally mushroom shaped—such that a proximal end nearest the main surface of the back portion 202 has a first cross-section and a distal end remote from the proximal end has a second cross-section which is larger (in at least one dimension) than the first cross-section. The or each pin 271 may have a circular cross-section (and the first and/or second cross-sections may be circular or rectangular)—although other shapes are envisaged (such as a stadium-shaped cross-section). In some embodiments, the or each pin 271 may, therefore, include a shaft (with the first cross-section) and a head (with the second cross-section).

In some embodiments in which the or each pin 271 has a stadium-shaped cross-section, the flat parts thereof may be arranged at top and bottom parts of the or each pin 271, and the rounded parts thereof may be arranged at side parts of the or each pin 271 (with the module 2 an upright configuration as depicted). In some embodiments, such as in FIGS. 33, 38, 39, the head of the or each pin 271 may be generally D-shaped and/or may extend with respect to the shaft of that pin 271 (perpendicular to a longitudinal axis thereof) in a first direction but not in an opposing second direction (e.g. to form an overhang over at least part of the shaft but not an overhand in all directions).

In the depicted and some other embodiments, there may be two pins 271 provided. In some embodiments which include a battery cover 28, at least one pin 271 may be provided on the battery cover 28 (and another pin 271, if provided, may be provided on another part of the back portion 202 of the module 2 (the battery cover 28 being part of the back portion 202)).

In some embodiments (including those depicted), the coupling arrangement 27 includes one or more latch elements 272. The or each latch element 272 may include a recess in a main surface of the housing 200 (which may be the main surface of the back portion 202 of the housing 200) and/or a protrusion from a main surface of the housing 200 (which, again, may be the main surface of the back portion 202 of the housing 200).

In some embodiments, including those depicted in FIGS. 11 to 25 for example, there is at least one latch element 272 in the form of a protrusion with a triangular or partially triangular cross-section. The protrusion may, therefore, include a drive surface **272*a* and a latch surface 272*b*. The drive surface 272*a* may be inclined with respect to the main surface of the back portion 202 of the housing 200, for example. The latch surface 272*b* may extend perpendicular to the main surface of the back portion 202 of the housing 200, for example. The drive surface 272*a* may be inclined with respect to a direction of movement of the housing 200 (and/or module 2) when fitting the module 2**—as will be apparent from the relevant parts of the description herein.

In embodiments in which the at least one latch element 272 includes a recess, the recess may be similarly shaped to have a drive surface and a latch surface.

In some embodiments, including those depicted in FIGS. 29, 31-34, and **37*a*-39, the at least one latch element 272 may be in the form of a button 273 located within an aperture 274 (i.e. a button aperture). The button 273 may be axially movable within the button aperture 274 between actuated and unactuated positions—as described herein—with respect to the rest of the module 2. The button aperture 274 may extend through an entire depth of the module 2. A head of the button 273 may be accessible for manual actuation from the front portion 201 of the module 2 and a driver of the button 273 may be located towards the back portion 202 of the module 2. The head and driver of the button 273 may be integrally formed. The button 273 may, therefore, have a mushroom-like shape—see FIGS. 37*a*,*b*, for example. The button 273 may be connected to the rest of the module 2 such that it is trapped within the button aperture 274 (allowing limited movement between the actuated and unactuated positions). This may be achieved by, for example, the use of a collar within the button aperture 274, and/or the provision of a living hinge between the button 274 and the rest of the module 2, and/or the use of a flexible coupling between the button 274 and the rest of the module 2 and/or the button 273 may be trapped between the two parts (201,202) of the two-part housing 200—see FIG. 37*b*, for example, in which a flange 273*a* of the button 273** is so trapped.

The button aperture 274 may be located in a recess in the front portion 201 of the module 2 and the recess may be configured to at least partially receive a digit during manual operation of the button 274.

In some embodiments, including those depicted, the or each pin 271 and the or each latch element 272 may be aligned along a common axis, which may be a longitudinal axis of the housing 200 (and this axis may be generally parallel to a longitudinal axis of a frame member 111 to which the module 2 is to be coupled). In at least the depicted embodiments, this a vertical axis with the module 2 fitted.

Embodiments include a securing member 3 (see FIGS. 1-18 and 35-39, for example). The securing member 3 may be configured to be fixed to the frame 11 or to the panel 12 (e.g. the frame member 111). The module 2 may be configured to be fixed to the securing member 3. Accordingly, the module 2 may be attached to the frame 11 or panel 12 using (i.e. via) the securing member 3. The securing member 3 may be sandwiched between the module 2 and the frame member 111 when so secured in place.

In some embodiments, the module 2 is secured to the frame member 111 solely by the securing member 3 and, in some such embodiments, no part of the module 2 touches or is otherwise in direct contact with the frame member 111.

The securing member 3 may include a body 31. The body 31 may include a fixing arrangement 32 for use in securing the securing member 3 to the frame member 111. The fixing arrangement 32 could take a number of different forms and may include more than one element.

For example, the fixing arrangement 32 may include a clip, hook or the like, configured to engage a part of the frame member 111. The fixing arrangement 32 may include a portion of the body 31 which can be moved with respect to another portion of the body 31 so as to increase a dimension of the body 31 an enable the body 31 to be secured between two opposing parts of the frame member 111, for example (i.e. in an outward clamping action). Likewise, the fixing arrangement 32 may include a portion of the body 31 which can be moved with respect to another portion of the body 31 so as to decrease a distance between the two portions to enable the two portions to clamp a part of the frame member 111 therebetween, for example (i.e. in an inward clamping action).

In the depicted and some other embodiments, the fixing arrangement 32 may include a fixing element **32*a* which is configured to be received by or otherwise mate with a fixing receiver 32*b* provided as part of the body 31. The fixing receiver 32*b* may be a through-hole defined by the body 31 or a slot defined by the body 31, for example. The fixing element 32*a*** may be screw (which may be a self-tapping screw), a rivet, a nut and bolt arrangement, a nail, or the like.

In some embodiments, the fixing arrangement 32 may be or include an adhesive (such as an adhesive covered pad which may be sandwiched between the body 31 and the frame member 111).

The body 31 of the securing member 3 may have an outer face (i.e. a face which is opposite an inner face which is secured to face the frame member 111) which is generally rectangular in shape, for example but other shapes are envisaged. In the depicted and some other embodiments, the outer face has a first part which is generally rectangular and a second part which extends therefrom and which is generally triangular (or a trapezoid). The inner face may be of generally the same shape as the outer face and a depth of the securing member 3 (and body 31) may be defined between the inner and outer faces thereof. As will be appreciated, the shapes of the inner and outer faces may define at least part of a shape of the body 31 and, therefore, the securing member 3.

In some embodiments, the fixing arrangement 32 may be located generally centrally with respect the securing member 3. In some embodiments, this may be generally through or adjacent part of the rectangular part of the outer and/or inner faces.

In some embodiments, more than one such fixing arrangement 32 is provided. Each fixing arrangement 32 in such embodiments may be spaced apart across the body 31—e.g. there may be a plurality of fixing receivers **32*b* each configured to receive a fixing element 32*a*. This is the case, for example, in the embodiment depicted in FIGS. 35 and 36**.

The fixing element **32*a* (or each fixing element 32*a* in some embodiments) may be configured to be countersunk with respect to the body 11 and outer face—such that, for example, no part of the fixing element 32*a* extends substantially above the outer face. The fixing receiver 32*b* (or fixing receivers 32*b*** in some embodiments) may be correspondingly formed, therefore, to allow for this countersunk configuration.

In some embodiments, there is a single (i.e. one and only one) fixing arrangement 32. In some embodiments, there are two fixing arrangements 32.

In some embodiments, as mentioned, the fixing element **32*a* may be a self-tapping screw which is configured to be passed through the fixing receiver 32*b* and then driven into the frame 11 (e.g. the frame member 111**).

Accordingly, the securing mechanism 3 may be secured to the frame 11 (e.g. to the frame member 111—which may be a frame member 111 of the first pair **111*a* or the second pair 111*b*—or the panel 12 (as discussed herein the frame member 111 may be parts of the panel 12 rather than the frame 11**).

The securing member 3 and, in some embodiments, the body 31 may define one or more grooves 33. The or each groove 33 may be defined in the inner face of the body 31. The or each groove 33 may be a linear groove 32. The or each groove 33 may be configured to receive a part of the frame member 111.

In particular, the frame member 111 may include one or more elongate projections along a length thereof. Such elongate projections may be configured for use in the fitting of a seal member to the frame member 111, or may be part of the structure of the frame member 111 to improve rigidity thereof, for example.

The or each groove 33 may extend through an entire length of a part of the securing member 3 (e.g. the body 31) and this may be the trapezoid part of the body 31 in some embodiments. The or each groove 33 may be open ended. The or each groove 33 may help in the locating of the securing member 3 with respect to the frame member 111. Accordingly, the or each groove 33 may be positioned in the body 31 at a position determined by the configuration of the frame member 111.

The securing member 3 may include a coupling configuration 34. The coupling configuration 34 of the securing member 3 may be configured to mate with or otherwise receive (or engage) at least part of the coupling arrangement 27 of the module 2—herein referred to as the fitting of the module 2 to the securing member 3. The fitting of the module 2 to the securing member 3, using the coupling configuration 34 and the coupling arrangement 27, may secure the module 2 to the securing member 3.

In some embodiments, the coupling configuration 34 includes a receiving configuration 341 to engage the coupling arrangement 27 or a part thereof (such as a clip or hook). In some embodiments, the arrangement is the other way around and the coupling configuration 27 may include a hook or clip and the coupling arrangement 27 may include the receiving configuration.

In the depicted and some other embodiments, the receiving configuration 341 includes at least one aperture **341*a* (defined in the body 31, for example). There may be a corresponding number of apertures 341*a* to the number of pins 271, for example—with each aperture 341*a* configured to receive a pin 271. Accordingly, the location of the or each aperture 341*a* may correspond with the location of the or each pin 271 to allow the fixing as described herein of the module 2 to the securing member 3**.

The or each aperture 341*a* may be a through-hole (or slot) in the body 31 or may be a blind-hole (or slot) in the outer face of the body 31.

In some embodiments, a first of the one or more apertures 341*a* may be joined by a channel 341*c* to a second of the one or more apertures 341*a*—see FIGS. 35, 36, 38, and 39, for example.

In some embodiments, the or each aperture 341*a* may include two respective parts—a wide part and a narrow part, the two parts may be along different lengths of the or each aperture 341*a* which may be in the form of a slot (which may also, as will be appreciated have a depth through the body 31. The wide part may be sized to allow the head of the corresponding pin 271 therethrough and the narrow part may be sized to prevent the head of the corresponding pin 271 from passing therethrough (but still sufficiently large to receive the neck of the pin 271). Accordingly, a pin 271 may be inserted into the corresponding aperture 341*a* through the wide part and then moved (linearly) across the aperture 341*a* until the neck of the pin 271 is passing through the narrow part and the head cannot be removed from the aperture 341*a* (other than be reversing the linear movement to align the head of the pin 271 with the wide part again). This is shown in stages, in relation to some embodiments, in FIGS. 38 and 39, for example.

In some embodiments, the narrow part may be part of the channel 341*c*—see FIGS. 35 and 36, for example.

As depicted, and in some other embodiments, there may two such apertures 341*a* and two such pins 271. There may be more than one receiving configuration 341. The two (or more) apertures 341*a* may be aligned with each other along a common axis.

The coupling configuration 34 may include a resiliently biased clip 342. The resiliently biased clip 342 may be configured to retain the module 2 selectively with the coupling configuration 34 and coupling arrangement 27 engaged with each other (so that the module 2 is fixed to the securing member 3).

The resilient biased clip 342 may be configured to engage at least of the module 2 to retain the module 2 in position with respect to the securing member 3. In particular, in some embodiments, with the one or more pins 271 retained by the receiving configuration 341 (e.g. the at least one aperture 341*a*), the resiliently biased clip 342 may selectively prevent disengagement of the or each pin 271 from the or each receiving configuration 341. This may, include, for example, preventing (selectively) movement of the module 2 with respect to the securing member 3 such that the respective heads of the or each pin 271 are not aligned with the wide part of the corresponding aperture 341*a* (e.g. such that the neck part remains aligned with the narrow part of the corresponding aperture 341*a*).

The resilient clip 341 may be configured to engage (selectively) the or each latch element 272.

Accordingly, the resilient clip 341 may include a non-return clip 342*a* which is configured to engage at least one of the one or more latch elements 272. The non-return clip 342*a* may have a generally triangular cross-section with an inclined drive surface 342*aa* and a latch surface 342*ab*. The drive surface 342*aa* of the non-return clip 342*a* may be sized and positioned so as to abut the drive surface 272*a* of a corresponding latch element 272. The continued linear movement of the module 2 with respect to the securing member 3 against this abutment may cause deflection (against the resilient biasing force of the resiliently biased clip 342) until the two drive surfaces 342*aa*,272*a* have passed over each other. The biasing force may then cause the two latch surfaces 272*b*,342*ab* to engage each other. These two latch surfaces 272*b*,342*ab* may be configured such that, when so engaged, reversal of the linear movement of the module 2 with respect to the securing mechanism 3 is substantially prevented.

The non-return clip 342*a* may be mounted on a part of the resiliently biased clip 342 which may provide the resilient biasing force. Accordingly the non-return clip 342*a* may be a member without any resilient biasing itself (which may be provided by another part of the resiliently biased clip 342). This part may be an elongate member 343 extending from the body 11, for example. The elongate member 343 may be formed form the same material as the body 31 (e.g. a plastics material). The resilient biasing force may be provided by virtue of the rigidity of the material used to form the elongate member 343 and/or the body 31. There may, however, be sufficient flexibility in the elongate member 343 and/or its coupling to the body 31 to permit deflection to allow the two drive surfaces 272*a*,342*aa* to move over each other. This flexibility may be provided, in part, by a living hinge (which may be a relatively stiff living hinge) between the elongate member 343 and the body 31.

The elongate member 343 may extend with respect to the body 31 from a side thereof (which may, in the depicted embodiments, be a top side of the body 31). The elongate member 343 may be a generally planar member with respect to the main body 31.

The resiliently biased clip 34 may include an actuation portion 343*a*. The actuation portion 343*a* may be a button and/or may be configured to be manually operated by a user.

In the depicted and some other embodiments, the actuation portion 343*a* is located at a distal end of the elongate member 343 (the proximal end being coupled to the body 31). The actuation portion 343*a* may include a head which is configured to enable relatively easy manual operation by the user. In some embodiments (e.g. such as those depicted), actuating the actuation portion 343*a* may require an external force (e.g. from a user's digit) to move the actuation portion 343*a* against the biasing force of the resiliently biased clip 342 to disengage the two latch surfaces 272*b*,342*ab* (to allow reversal of the movement of the module 2 with respect to the securing member 3, as described herein). For example, a user may press the actuation portion 343*a* and this may disengage the two latch surfaces 272*b*,342*ab*.

The head of the actuation portion 343*a* may have a depth which is greater than another part of the elongate member 343 (e.g. a part which is behind the module 2 when that module 2 is so fitted)—to make it easier for the user to actuate when the module 2 fitted to the securing member 3. The head may have a semi-circular cross-section, for example—although other shapes are envisaged.

The head may be located to a side (e.g. a top side) of the module 2, with the module 2 fitted to the securing member 3. This may be achieved by virtue of the length, for example of the elongate member 343.

As will be appreciated, the orientation of the resiliently biased clip 342 must, in some embodiments, be aligned with that of the receiving configuration 341. This enables the receipt of the or each pin 271 in one or more respective apertures 341*a* and the linear movement of the module 2 with respect to the securing member 3 to engage the two latch surfaces 272*b*,342*ab*. This engagement may then prevent the reverse movement of the module 2 with respect to the securing member 3.

In some embodiments, the actuation portion 343*a* is configured to engage the button 273 and this may occur within the button aperture 274, for example. The engagement may be such that the actuation portion 343*a* engages the driver of the button 273. The actuation portion 343*a* may be a domed member in some embodiments, and the driver of the button 273 may be correspondingly shaped to receive at least part of the domed actuation portion 343*a*. This can be seen in, for example, FIGS. 37*a,b*. Retention of the actuation portion 343*a* at least partially within the button aperture 274 may hold the module 2 in place with respect to the securing member 3—with the button in the unactuated position. Actuation of the button 273 (to the actuated position) may depress the actuation portion 343*a* (which may be resiliently biased, e.g. by a living hinge, into engagement with the button 273) may allow the release of the module from the securing member 2, for example (by movement of the actuation portion 343*a* out of the button aperture 274). This arrangement may be present embodiments including the button 273, for example. Actuation portion 343*a* may be considered to be a resilient clip, for example. In some such embodiments, therefore, the actuation port 343*a* is indirectly operated, by intermediate use of the button 273 (said button 273 being, for example, manually operated by a user digit in some embodiments).

Although embodiments have been depicted and described with linear movement of the module 2 with respect to the securing member 3, rotational movement is also possible in some embodiments (e.g. using at least one arcuate aperture 341*a*). In some embodiments, movement of the module 2 into engagement with the securing member 3 is against gravity (e.g. an upward movement).

In either case, of linear or rotational movement, the movement is a sliding movement and the description should be construed accordingly.

In some embodiments, the or each aperture 341*a* includes (i.e. is at least partially defined by) a locking surface 341*b* of the body 11. This locking surface 341*b* may be configured to engage at least part of a respective received pin 271 (e.g. a part of the head of that pin 271). The locking surface 341*b* may be inclined with respect to the inner and/or outer face of the body 11 such that the received part of the pin 271 (e.g. the head) is forced rearwardly (e.g. in a depth direction) as the pin 271 passes into the narrow part of the aperture 341*a* (see the figures). In some embodiments, the aperture 341*a* may include an internal shelf which provides the locking surface 341*b*. The shelf may extend around or along part of an internal circumference or perimeter of the aperture 341*a* and/or the channel 341*c* if provided, and may be U-shaped. In some embodiments, a single aperture 341*a* has a locking surface 341*b*. In some embodiments, some or all of a plurality of apertures 341*a* may include respective locking surfaces 341*b*. The use of the or each locking surface 341*b* may assist in retaining the module 2 in place with respect to the securing member 3 (in combination with the engagement of the two latch surfaces 272*b*,342*ab*, for example).

The locking surface 341*b* may be in the form of a taper lock, for example a 3° taper lock (in particular, the locking surface 341*b* may be at an angle of around 3° from a main plane of the main body 31)—see the figures.

In some embodiments, the channel 341*c* is provided with internally projecting ridges along its outer edges which are configured to retain at least part of a pin 271 passing along the channel 341*c*—best seen in FIG. 36.

The frame member 111 to which the securing member 3 and module 2 may be fitted could have a number of different profiles (i.e. cross-sectional shapes). As described the frame member 111 may be a part of the frame 11 in relation to which the panel 12 moves or may, indeed, be part of a frame of the panel 12 (which may move with respect to another frame or other panel 12).

In any event, however, when the door or window 1 is in the closed condition, a channel may be defined between at least part of the panel 12 and the frame 11. This channel may accommodate, for example, parts of the lock or latch mechanism 13 and may provide sufficient space for this to operate freely.

The channel may be generally inaccessible from the exterior of the window or door 1 when in the closed condition. In some embodiments, the frame member 111 may be such that there is at least one edge lip extending along an outer and/or inner edge of the frame member 111 along its length and at least partially defining the channel.

In some embodiments, the securing member 3 and module 2 are entirely or substantially entirely contained within the channel. With respect to a frame member 111, a volume may be defined between the outer and inner edge of the frame member 111 along its length and the securing member 3 and module 2 may be entirely or substantially entirely contained within this volume.

The securing member 3 and module 2 may be sized and shaped such that, when fitted, they do not foul the operation of the door or window 1—as it changes condition between the open and closed conditions and/or between the locked and unlocked conditions.

The body 31 (and/or the entire securing member 3) may have a width equal to, substantially equal to, or less than the width of the channel. The body 31 may have a width equal to, substantially equal to, or less than a depth of the frame member 111.

As will be understood from the description herein, at least part of the frame member 111 may be received by at least part of the securing member 3. The securing member 3 and frame member 111 may, therefore, interlock.

The securing member 3 may be a packer, for example. As such, the securing member 3 may provide a spacing function to ensure that the module 3 is correctly located to sense the condition of the door or window 1.

In some embodiments, the magnet 40 (and, in some embodiments the magnet housing 41) are entirely or substantially entirely contained within the channel. With respect to a frame member 111, a volume may be defined between the outer and inner edge of the frame member 111 along its length and the magnet 40 (and, in some embodiments the magnet housing 41) may be entirely or substantially entirely contained within this volume.

The magnet 40 (and, in some embodiments the magnet housing 41) may be sized and shaped such that, when fitted, they do not foul the operation of the door or window 1—as it changes condition between the open and closed conditions and/or between the locked and unlocked conditions.

When the door or window 1 is in the closed condition, the channel may not be accessible—i.e. the panel 12 may prevent access by blocking off any part of the channel that would be open if the door or window 1 were in the open condition. Therefore, a potential burglar may be prevented or hindered from accessing the module 2.

In some embodiments, a window or door fitter may fit the securing member 3 to the frame 11 during installation of the window or door 1. This may include selection of the correct securing member 3 from a plurality of securing members 3 for the frame member 111. The fitter may then position the securing member 3 in the correct location to ensure that the module 2 operates correctly. The fitter may secure the securing member 3 using the fixing arrangement 32. In some embodiments, one or more markers 300 (which may be grooves in the body 31 or printed on the body 31, for example) may be used by the fitter for alignment of the securing member 3 at the correct location with respect to the frame member 111 and/or the lock or latch mechanism 13.

The window or door 1 may then be used as normal.

The user may then, at some later time, decide to install the module 2. The user may be aware that the window or door 1 is configured to receive a module 2 by virtue of the presence of the securing member 3. The securing member 3 may carry information or indicators to provide the user with information as to the type of module 2 which may be fitted to the securing member 3. The indicators may include at least one arrow and/or line or other marking 300 indicating a boundary of the part of the securing member 3 covered by the module 2, when the module 2 is correctly fitted.

The user may fit the module 2 to the securing member 3 by positioning the module 2 such that the coupling arrangement 27 engages the coupling configuration 34. For example, such that the or each pin 271 is received by a respective receiving configuration 341 (such as an aperture 341*a*). In some embodiments, the resiliently biased clip 342 is then operated to secure the module 2 to the securing member 3. For example, the module 2 may be moved linearly (or rotationally) with respect to the securing member 3. In some embodiments, this movement is a vertical movement upwards, against gravity. In some embodiments, this movement in parallel to a longitudinal axis of the frame member 111. This movement may move the or each pin 271 within the or each receiving configuration 341 (e.g. aperture 341*a*). The drive surfaces 342*aa*, 272*a* may engage as described herein and continued movement of the module 2 may cause the latch surfaces 272*b*,342*ab* to engage each other. The operation of the resiliently biased clip 342 may, therefore, be automatic on movement of the module 2 with respect to the securing member 3. The module 2 may be substantially prevented from being released from the securing member 3.

The module 2 may then be located correctly for operation (e.g. correctly spaced from the frame member 111).

Similarly, the magnet 40 may be fitted to the magnet attachment point 42 (which may also be accessible from the channel and so only when the window or door is open). The magnet 40 may be fitted to the magnet attachment point 42 by insertion, for example, to the magnet 40 (which may be housed in the magnet housing 41) into the magnet attachment point 42. The magnet 40 and/or the magnet housing 41 may be at least partially received by the magnet attachment point 42.

One or more indicators 300 may be provided on the securing member 3 to confirm the correct location of the module 2 with respect to the securing member 3—such as indicators for alignment with an edge or other extremity of the module 2.

The module 2 may be removed by use of the actuation portion 343*a* as described herein. This may require actuation of the button 273 in embodiments including this button 273, for example.

Accordingly, the module 2 may be fitted and/or replaced without the need for tools and by a relatively unskilled user.

In some embodiments, the fitter may install a dummy module 2 which may need to be removed before a module 2 is fitted by the user. The dummy module 2 may be the same as a module 2 described herein but may be non-functional and may not include the processor 25, controller 23, sensor 21, and computer readable medium 26.

As described, some embodiments include a sensor 21 with at least two Hall Effect sensors H1,H2. These are examples of sensor units H1,H2 which are capable of sensing a magnetic field. These sensor units H1,H2 may be configured to sense a magnetic field in a single (i.e. one and only one) sensing axis, for example (which may be a sensing axis which is common to both sensor units H1,H2). The sensor units H1,H2 may be arranged within the module 2 such that the magnet 40 moves with respect to the sensor units H1,H2 from a position to a first side of both of the two sensor units H1,H2 to a position to a second side of both of the sensor units H1, H2 as the lock or latch mechanism 13 is actuated between the locked condition and the unlocked condition (passing the two sensor units H1,H2 during this movement). This is generally described with reference to FIGS. 40-43.

FIGS. 40-43 show the magnet 40 schematically represented and mounted for movement with a part of the lock or latch mechanism 13—such that the position of the magnet 40 with respect to the sensor units H1,H2 changes as the lock or latch mechanism 13 is actuated between the locked and unlocked conditions.

The sensor units H1,H2 forming parts of the sensor 21 are schematically depicted as mounted to a circuit board, for example.

As will be understood, FIGS. 40-43 do not show other features of the embodiments—including other features of the module 2—for the sake of simplicity of explanation.

With the moveable panel 12 in the closed configuration, the sensor units H1,H2 may be located along a path of the magnet 40 but spaced apart therefrom (and in practice other parts of the module 2 may be located between the sensor units H1,H2 and the magnet 40, for example). The magnet 40, with the moveable panel 12 in the closed configuration, may travel along the path and that path may have a path axis. The sensor units H1,H2 may be aligned with that path axis, but offset with respect thereto (to provide non-contact sensing, for example). The sensor units H1,H2 may be said to have a sensing axis which is an axis which passes through both sensor units H1,H2 and which is parallel to the path axis.

The magnet 40 as a north pole N and a south pole S as depicted.

With the moveable panel 12 in the closed configuration and the magnet 40 located at a first side of both sensor units H1,H2, the lock or latch mechanism may be in the unlocked configuration. This is generally depicted in the upper drawing of FIGS. 40-43 and represents an unlocked position for the magnet 40.

If the moveable panel 12 is moved to the open configuration, then the magnet 40 will move further away from the sensor units H1,H2. With reference to FIGS. 40-43 this may be a movement downwardly and/or into or out of the page, for example (depending on the type of door or window 1).

As the lock or latch mechanism 13 is actuated to the locked configuration, the magnet 40 moves along a magnet path (which may be a linear—i.e. substantially straight—path. The magnet 40 may, therefore, move past a first H1 of the sensor units H1,H2 to a position between the two sensor units H1,H2, and this is generally shown in the middle drawings of FIGS. 40 and 41. In FIGS. 42 and 43, the sensor unit H1,H2 positions have been reversed, so that magnet 40 moves along the magnet path past a second H2 of the sensor units H1,H2 to a position between the two sensor units H1,H2—see the middle drawings of FIGS. 42 and 43. This, in this interim position, the magnet 40 is to the first side of one sensor unit (the first sensor unit H1 in FIGS. 42 and 43 but the second sensor unit H2 in FIGS. 40 and 41) and to a second side of the other sensor unit (the first sensor unit H1 in FIGS. 40 and 41 but the second sensor unit H2 in FIGS. 42 and 43). This position may be referred to as an interim position and may form part of a movement to or from the locked configuration of the lock or latch mechanism 13.

As the lock or latch mechanism 13 reaches the locked configuration, the magnet 40 has moved (along the magnet path) to a position at the second side of both of the sensor units H1,H2. The magnet 40 may, therefore, move (i.e. continue) past the second H2 of the sensor units H1,H2 and this is generally shown in the bottom drawings of FIGS. 40 and 41. In FIGS. 42 and 43, the sensor unit H1,H2 positions have been reversed, so that magnet 40 moves along the magnet path past the first H1 of the sensor units H1,H2 to a position at the second side of both sensor units H1,H2—see the bottom drawings of FIGS. 42 and 43. This may be referred to as a locked position of the magnet 40.

Therefore, for example, when moving from the unlocked to the locked configuration of the lock or latch mechanism 13, the magnet 40 may move along the magnet path as depicted sequentially in figured 40-43 from the top drawings thereof to the bottom. When the lock or latch mechanism 13 moves from the locked to the unlocked configuration, the movement along the magnet path (of the magnet 40) may be reversed.

The sensor units H1,H2 may each be configured to detect the presence of a magnetic field generated by the magnet 40. The sensor units H1,H2 may, therefore, be configured to detect the proximity of the magnet 40 with respect thereto. The sensor units H1,H2 may use a magnet field strength threshold such that the magnet field strength sensed by the sensor units H1,H2 must be above the threshold in order for the sensor unit H1,H2 to indicate the proximity of the magnet 40 thereto. In some embodiments, there may also be an upper threshold applied such that if the magnetic field strength is above the upper threshold then it may be determined, by the sensor units H1,H2 (individually or collectively) that the magnetic field is from an external source and this may trigger a tamper alert.

The sensor units H1,H2 are also configured to detect a polarity of the magnet field (that is a polarity of the magnetic field which has been sensed or the sensed magnetic field) such that each sensor unit H1,H2 is configured to determine which pole of the magnet 40 is in closest proximity to that sensor unit H1,H2.

As will be appreciated from figured 40-43, the magnetic field polarity sensed at each sensor unit H1,H2 will depend on the position of the magnet 40 along the magnet path (with the moveable panel 12 in the closed configuration).

The magnetic field polarity sensed by each sensor unit H1,H2 for the arrangements in each of figured 40-43 is shown in FIGS. 44-47 respectively.

Therefore, with reference to FIGS. 40 and 44, with the moveable panel 12 in the open configuration neither sensor unit H1,H2 will detect a magnetic field (or any detected magnetic field may be below a required threshold as described). This is shown in FIG. 44 but not depicted in FIG. 40.

With the moveable panel 12 in the closed configuration and the lock or latch mechanism 13 in the unlocked configuration, the magnet 40 is to the first side of both of the sensor units H1,H2. The first sensor unit H1, in this embodiment, is closest to the magnet 40 and detects the proximity of the magnet 40 and that it is the north pole N of the magnet which is closest to the first sensor unit H1. The magnetic field at the second sensor unit H2 may be too low to be detected and/or may be below the threshold (as described). This is shown in the upper drawing of FIG. 40 and in the table of FIG. 44.

As the lock or latch mechanism 13 is actuated towards the locked configuration, the magnet 40 travels along the magnet path to the interim position and this is depicted in the middle drawing of FIG. 40. In this position, both the first H1 and second H2 sensor units may detect the proximity of the magnet 40, with the first sensor unit H1 detecting the proximity of the south pole S of the magnet 40 and the second sensor unit H2 detecting the proximity of the north pole N of the magnet 40. This is generally shown in the middle drawing of FIG. 40 but is not shown in FIG. 44.

As the lock or latch mechanism 13 is actuated further towards the locked configuration, the magnet 40 travels along the magnet path to the locked position and this is depicted in the bottom drawing of FIG. 40. In this position, the second H2 sensor unit may detect the proximity of the magnet 40, with the second sensor unit H2 detecting the proximity of the south pole S of the magnet 40. The magnetic field at the first sensor unit H1 may be too low to be detected and/or may be below the threshold (as described). This is generally shown in the bottom drawing of FIG. 40 and in FIG. 44.

In some embodiments, the orientation of the magnet 40 with respect to the sensor 21 may not be known prior to installation. This may be because the orientation of the magnet 40 within the magnet housing 41 was not predefined at the time of securing the magnet 40 within the magnet housing 41 or may be because the magnet housing 41 can have different orientations (in some embodiments) when secured to the magnet attachment point 42 or may be because the magnet attachment point 42 may have been installed in two or more different orientations with respect to the location of the sensor 21, for example.

Accordingly, FIGS. 41 and 45 consider the same arrangement of first and second sensor units H1,H2 as discussed in relation to FIGS. 40 and 44 but with the orientation of the magnet 40 reversed relative thereto.

Therefore, with reference to FIGS. 41 and 45, with the moveable panel 12 in the open configuration neither sensor unit H1,H2 will detect a magnetic field (or any detected magnetic field may be below a required threshold as described). This is shown in FIG. 45 but not depicted in FIG. 41.

With the moveable panel 12 in the closed configuration and the lock or latch mechanism 13 in the unlocked configuration, the magnet 40 is to the first side of both of the sensor units H1,H2. The first sensor unit H1, in this embodiment, is closest to the magnet 40 and detects the proximity of the magnet 40 and that it is the south pole S of the magnet which is closest to the first sensor unit H1. The magnetic field at the second sensor unit H2 may be too low to be detected and/or may be below the threshold (as described). This is shown in the upper drawing of FIG. 41 and in the table of FIG. 45.

As the lock or latch mechanism 13 is actuated towards the locked configuration, the magnet 40 travels along the magnet path to the interim position and this is depicted in the middle drawing of FIG. 41. In this position, both the first H1 and second H2 sensor units may detect the proximity of the magnet 40, with the first sensor unit H1 detecting the proximity of the north pole N of the magnet 40 and the second sensor unit H2 detecting the proximity of the south pole S of the magnet 40. This is generally shown in the middle drawing of FIG. 41 but is not shown in FIG. 45.

As the lock or latch mechanism 13 is actuated further towards the locked configuration, the magnet 40 travels along the magnet path to the locked position and this is depicted in the bottom drawing of FIG. 41. In this position, the second H2 sensor unit may detect the proximity of the magnet 40, with the second sensor unit H2 detecting the proximity of the north pole N of the magnet 40. The magnetic field at the first sensor unit H1 may be too low to be detected and/or may be below the threshold (as described). This is generally shown in the bottom drawing of FIG. 41 and in FIG. 45.

It may also be that the orientation of the sensor 21 is reversed with respect to the magnet 40. This may occur as a result of use of the same module 2 in relation to multiple different door and window 1 configurations—which may result in different placement (including different orientations of placement) of the securing member 2. This different orientation may result in reversal of the orientation of the sensor units H1,H2 as discussed above in relation to FIGS. 40 and 41. Yet again, with this reversal, the magnet 40 orientation could also be in either relative arrangement as discussed in relation to FIGS. 40 and 41 respectively. These possibilities are, therefore, shown in FIGS. 42, 43, 46, and 47.

Therefore, with reference to FIGS. 42 and 46, with the moveable panel 12 in the open configuration neither sensor unit H1,H2 will detect a magnetic field (or any detected magnetic field may be below a required threshold as described). This is shown in FIG. 46 but not depicted in FIG. 42.

With the moveable panel 12 in the closed configuration and the lock or latch mechanism 13 in the unlocked configuration, the magnet 40 is to the first side of both of the sensor units H1,H2 (wherein the first side in this instance may be equivalent to the second side as described in relation to FIGS. 40 and 41, for example). The second sensor unit H2, in this embodiment, is closest to the magnet 40 and detects the proximity of the magnet 40 and that it is the north pole N of the magnet which is closest to the second sensor unit H2. The magnetic field at the first sensor unit H1 may be too low to be detected and/or may be below the threshold (as described). This is shown in the upper drawing of FIG. 42 and in the table of FIG. 46.

As the lock or latch mechanism 13 is actuated towards the locked configuration, the magnet 40 travels along the magnet path to the interim position and this is depicted in the middle drawing of FIG. 42. In this position, both the first H1 and second H2 sensor units may detect the proximity of the magnet 40, with the first sensor unit H1 detecting the proximity of the north pole N of the magnet 40 and the second sensor unit H2 detecting the proximity of the south pole S of the magnet 40. This is generally shown in the middle drawing of FIG. 42 but is not shown in FIG. 46.

As the lock or latch mechanism 13 is actuated further towards the locked configuration, the magnet 40 travels along the magnet path to the locked position and this is depicted in the bottom drawing of FIG. 42. In this position, the first H1 sensor unit may detect the proximity of the magnet 40, with the first sensor unit H1 detecting the proximity of the south pole S of the magnet 40. The magnetic field at the second sensor unit H2 may be too low to be detected and/or may be below the threshold (as described). This is generally shown in the bottom drawing of FIG. 42 and in FIG. 46.

With the magnet 40 orientation reversed relative to that in FIG. 42, reference is made to FIGS. 43 and 47, with the moveable panel 12 in the open configuration neither sensor unit H1,H2 will detect a magnetic field (or any detected magnetic field may be below a required threshold as described). This is shown in FIG. 47 but not depicted in FIG. 43.

With the moveable panel 12 in the closed configuration and the lock or latch mechanism 13 in the unlocked configuration, the magnet 40 is to the first side of both of the sensor units H1,H2 (wherein the first side in this instance may be equivalent to the second side as described in relation to FIGS. 40 and 41, for example). The second sensor unit H2, in this embodiment, is closest to the magnet 40 and detects the proximity of the magnet 40 and that it is the south pole S of the magnet which is closest to the second sensor unit H2. The magnetic field at the first sensor unit H1 may be too low to be detected and/or may be below the threshold (as described). This is shown in the upper drawing of FIG. 43 and in the table of FIG. 47.

As the lock or latch mechanism 13 is actuated towards the locked configuration, the magnet 40 travels along the magnet path to the interim position and this is depicted in the middle drawing of FIG. 43. In this position, both the first H1 and second H2 sensor units may detect the proximity of the magnet 40, with the first sensor unit H1 detecting the proximity of the south pole S of the magnet 40 and the second sensor unit H2 detecting the proximity of the north pole N of the magnet 40. This is generally shown in the middle drawing of FIG. 43 but is not shown in FIG. 47.

As the lock or latch mechanism 13 is actuated further towards the locked configuration, the magnet 40 travels along the magnet path to the locked position and this is depicted in the bottom drawing of FIG. 43. In this position, the first H1 sensor unit may detect the proximity of the magnet 40, with the first sensor unit H1 detecting the proximity of the north pole N of the magnet 40. The magnetic field at the second sensor unit H2 may be too low to be detected and/or may be below the threshold (as described). This is generally shown in the bottom drawing of FIG. 43 and in FIG. 47.

The controller 23 of the module 2 may be configured to receive information from the sensor 21 and this may be information from the or each sensor unit H1,H2. This information may include an indication that a magnetic field has been detected, the polarity of the detected magnet field, and/or the strength of the magnetic field. Thresholds are discussed above and these may be applied by the sensor 21 or by the controller 23 or both.

The controller 23 may be configured, therefore, to receive the information from the sensor 21 and to determine the current configuration of the moveable panel 12 (i.e. open or closed) and the current configuration of the lock or latch mechanism 13 (i.e. locked or unlocked).

For a given relative orientation of the module 2 with respect to the magnet attachment point 43, for example, the controller 23 can determine the current configuration of the panel 12 and the lock or latch mechanism 13 irrespective of the orientation of the magnet 40. With reference to figured 44 and 45, for example, the detection of a magnetic field by the second sensor unit H2 indicates that the lock or latch mechanism 13 is locked (and the moveable panel 12 is closed). Likewise, the detection of a magnetic field by the first sensor unit H1 indicates that the lock or latch mechanism 13 is unlocked (and the moveable panel 12 is closed). If there is no magnetic field detected by either sensor unit H1,H2, then the moveable panel 12 is open. If the orientation of the sensor units H1,H2 is reversed (as in FIGS. 46 and 47), then the same is true but for the second sensor unit H2 instead of the first sensor unit H1.

The controller 23 may be configured to learn the relative orientation of the sensor 21 and the magnet 40 on first installation and may store this information as setup information on the computer readable medium 26, for example.

In particular, the controller 23, using the information received from the sensor 21, may detect the position of the magnet 40 relative to the sensor units H1,H2 when the moveable panel 12 moves from the closed to the open configuration. When this occurs, the lock or latch mechanism 13 is, by definition, in the unlocked configuration. This may, therefore, enable the controller 23 to store the expected magnetic field polarity at the first or second sensor unit H1,H2 with the lock or latch mechanism 13 in the unlocked configuration. This also allows the controller 23 to determine (and store) the expected magnetic field polarity at the other of the first and second sensor unit H1,H2 with the lock or latch mechanism 13 in the locked configuration.

In some embodiments, the controller 23 may use the sensed magnetic field orientation at the sensor units H1,H2 in the interim position to confirm (in part) the likely relative orientation of the sensor 21 and magnet 40 with respect to each other. This may be particularly useful as confirmation or an alternative learning step in embodiments in which the orientation of the either the magnet 40 with respect to the sensor 21 is fixed (but the positions of the sensor units H1,H2 within the sensor 21 is not known) or the positions of the sensor units H1,H2 within the sensor 21 are known), for example.

If the controller 23 determines an unexpected change in the sensed magnetic fields, then the controller 23 may generate a tamper alert. An expected change may be the changes expected in the magnetic fields sensed when the lock or latch mechanism 13 is moved from the locked to the unlocked configuration and/or the moveable panel 12 is opened or closed.

An unexpected change may be an magnetic field detected at the first and/or second sensor unit H1,H2 which is not of an expected magnetic polarity and/or magnetic field strength (e.g. too high). So, for example, if an external magnet is broad close to the sensor 21 then the magnetic field may be higher than expected or the polarity of the magnetic field sensed at any one sensor unit H1,H2 may not fit with what is expected for the different configurations of the lock or latch mechanism 13. For example, if both the first and second sensor units H1,H2 detect a magnetic field of the same polarity, then this is likely the result of an external magnet being used to tamper with the operation of the module 2. If the field strength is higher at either sensor unit H1,H2 than normally sensed as a result of the magnet 40, then this may also be an indication of the presence of an external magnet. The controller 23 may be configured to require the unexpected magnetic field to be sensed for a predetermined period of time before a tamper alert is generated and this may help to prevent false alarms. In some embodiments, the tamper alert may be triggered when there are more than a predetermined number of trigger events (each being a sensed unexpected magnetic field) within the predetermined time period—which may be the result of someone moving an external magnet relative to the module 2.

A tamper alert may also or alternatively be generated by the controller 23 if the sensed magnetic fields indicate that the moveable panel 12 has moved to the open configuration from the closed configuration, with the sensed magnetic fields indicating that the lock or latch mechanism 13 has not changed from the locked to the unlocked configuration, for example.

On the generation of a tamper alert, the controller 23 may cause the communications subsystem 24 to deliver the alert to a hub 24*a*—from which a user may be notified (via their computing device, for example).

As will be appreciated, the flexibility provided by the different orientations of the magnet 40 and sensor 21 (and positions of the sensor units H1,H2) enables the same module 2 to be used in a wide variety of applications and simplifies the installation process—particularly if being installed by a consumer user.

As will be understood, in some embodiments, there are at least two sensor units H1,H2 provided as part of the sensor 21. With the moveable panel 12 in the closed configuration, the magnet 40 is located (which may also mean that the magnet housing 41 and magnet attachment point 42 are similarly located) such that it is moveable from a first side of both sensor units H1,H2 to a second side of both sensor units H1,H2 depending on the configuration state (i.e. locked or unlocked) of the lock or latch mechanism 13. The movement of the magnet 40 is along the magnet path and this may take the magnet 40 past one of the sensor units H1,H2 to an interim position prior to reaching each end of the magnet path during use. In some embodiments, there is a single (i.e. one and only one) magnet 40 which moves along this magnet path and only one magnet 40 (i.e. the same one and only one magnet 40) which is sensed by the sensor units H1,H2 in normal operation (e.g. when there is no tampering or external magnet). The magnet 40 may be oriented such than an axis through its north N and south S poles (e.g. the magnetic axis of the magnet 40) is aligned with the magnet path. For the avoidance of doubt, the magnet path is defined herein with the moveable panel 12 in its closed configuration (movement of the moveable panel 12 to the open configuration will move the magnet 40 in such embodiments) off the magnet path.

As will be appreciated, an attachment system according to embodiments may include the securing member 3 and/or the module 2.

Embodiments may include the window or door 1 to which the securing member 3 has been fitted. Embodiments may include the window or door 1 to which the securing member 3 and module 2 have been fitted. Embodiments may include the window or door 1 with or without the magnet attachment location 43, and/or with or without the magnet 40.

Embodiments may include the frame 11 to which the securing member 3 has been fitted. Embodiments may include the frame 11 to which the securing member 3 and module 2 have been fitted. Embodiments may include the frame member 111 to which the securing member 3 has been fitted. Embodiments may include the frame member 111 to which the securing member 3 and module 2 have been fitted.

Embodiments may include a method of fitting the securing member 3 to the frame member 111 and/or frame 11 and/or door or window 1. Embodiments may include a method of fitting the module 2 to the securing member 3. Embodiments may include a method of replacing the module 2 with a different module 2 on the securing member 3.

Embodiments may include the learning process discussed herein.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

Representative features are set out in the following clauses, which stand alone or may be combined, in any combination, with one or more features disclosed in the text and/or drawings of the specification.

Aspects

1. An attachment system for a door or window, the attachment system being configured to sense a condition of a door or window, the attachment system including:

a securing member configured to be mounted to a frame member of the door or window; and a module, configured to be coupled to a frame member by attachment to the securing member, the module including a sensor to sense the condition of the door or window, and the securing member including a resiliently biased clip configured to retain the module in attachment to the securing member selectively, wherein the securing member is configured to space the module from at least part of the frame member such that the sensor is positioned to sense the condition of the door or window.

2. An attachment system according to aspect 1, wherein the securing member is a substantially planar member.

3. An attachment system according to aspect 1 or 2, wherein the securing member includes fixing arrangement to secure the securing member to the frame member.

4. An attachment system according to aspect 3, wherein the fixing arrangement includes a fixing element and a fixing receiver, the fixing element being configured to be received by the fixing receiver and to engage the frame member.

5. An attachment system according to any preceding aspect, wherein the securing member includes a body defining one or more grooves, the or each groove being configured to receive at least part of the frame member.

6. An attachment system according to any preceding aspect, wherein the securing member includes a receiving configuration and the module includes one or more pins, the or each pin being configured to be received by the receiving configuration, and the resilient clip being configured to inhibit the removal of the or each pin from the receiving configuration selectively.

7. An attachment system according to aspect 6, wherein the receiving configuration includes an inclined locking surface configured to engage and guide part of at least one of the or each pin.

8. An attachment system according to any preceding aspect, wherein the resilient clip includes a drive surface and a latch surface, the module includes a latch element including a drive surface and a latch surface, the latch surfaces of the resilient clip and latch element are configured to engage as the module is secured to the securing member such that the latch surfaces of the resilient clip and latch element engage.

9. An attachment system according to any preceding aspect, wherein the resilient clip is part of a coupling configuration of the securing member which further includes an elongate member and an actuation portion, wherein manual operation of the actuation portion is configured to move at least part of the elongate member to release the resilient clip.

10. An attachment system according to any preceding aspect, wherein the sensor is a reed switch.

11. An attachment system according to any of aspects 1 to 9, wherein the sensor is a mechanical switch.

12. A door or window including an attachment system according to any preceding aspect.

13. A door or window according to aspect 12, wherein the securing arrangement is configured to fit between a frame of the door or window and a moveable panel of the door or window, such that the moveable panel is moveable between open and closed conditions without the securing member fouling this operation of the door or window.

14. A door or window according to aspect 13, wherein the securing member is inaccessible when the door or window is in the closed condition.

15. A door or window according to any of aspects 12 to 14, wherein the moveable panel is configured to move with respect to the frame member when the door or window is operated between the open and closed conditions.

16. A door or window according to any of aspects 12 to 14, wherein the moveable panel is configured to move with the frame member when the door or window is operated between the open and closed conditions.

17. A door or window including a frame member and a securing member, wherein the securing member is suitable for use in an attachment system according to any of aspects 1 to 11.

18. A method of manufacturing a door or window including:

providing a frame member; and securing a securing member to the frame member, wherein the door or window is a door or window according to aspect 17.

19. A method of fitting a door or window including:

providing a frame member; and securing a securing member to the frame member, wherein the door or window is a door or window according to aspect 17.

20. A method of fitting a module to a door or window, including:

identifying a door or window according to aspect 17;

proving a module; and fitting the module to the securing member.

21. A method according to aspect 20, further including operating the door or window to an open condition before fitting the module to the securing member.

The invention claimed is:

1. A door or window including:

a lock or latch mechanism actuatable between a locked and an unlocked condition;

a system configured to determine the condition of the lock or latch mechanism, the system including:

a module including first and second sensor units;

a magnet configured to be attached to a part of the lock or latch mechanism such that the magnet moves along a magnet path with actuation of the lock or latch mechanism, the magnet having a magnetic axis which is directionally aligned with the magnet path, the magnet path passing both of the first and second sensor units, such that the module is configured to determine a current condition of the lock or latch mechanism by using the first and second sensor units to sense changes in a polarity of a sensed magnetic field generated by the magnet as the magnet moves along the magnet path.

2. The door or window according to claim 1, wherein the magnet path extends from a first side of both the first and second sensor units to a second side of both the first and second sensor units.

3. The door or window according to claim 1, wherein the orientation of the magnet is reversible with respect to the module and the module includes a controller which is configured to learn an orientation of the magnet using the first and second sensor units.

4. The door or window according to claim 3 wherein the controller is further configured to generate a tamper alert in response to the first and/or second sensor units detecting a magnetic field from an external magnet.

5. The door or window according to claim 1, wherein the module is configured to be attached to a first frame member of the door or window and the magnet is configured to be attached to a second frame member of the door or window, the first and second frame members are positioned adjacent each other when the window or door is in a closed condition, the first and second frame members are configured to move apart from each other as the window or door moves towards an open condition, and the first and second sensor units are configured to detect movement of the magnet away from the module to determine movement of the window or door to the open condition.

6. The window or door according to claim 1, wherein the magnet path is a substantially linear path.

7. A module for use in determining the condition of a latch or lock mechanism of a door or window, the module including:

first and second sensor units configured to sense changes in a polarity of a sensed magnetic field of a magnet as the magnet moves along a magnet path, the magnet moving along the magnet path with actuation of a lock or latch mechanism between an unlocked and a locked condition, the magnet having a magnetic axis which is directionally aligned with the magnet path and the magnet path passing both of the first and second sensor units, such that the module determines a current condition of the lock or latch mechanism by using the sensed changes in the sensed polarity of a magnetic field generated by the magnet as the magnet moves along the magnet path.

8. The module according to claim 7, wherein the module is configured such that the magnet path extends from a first side of both the first and second sensor units to a second side of both the first and second sensor units.

9. The module according to claim 7, wherein the orientation of the magnet is reversible with respect to the module and the module includes a controller which is configured to learn an orientation of the magnet using the first and second sensor units.

10. The module according to claim 9, wherein the controller is further configured to generate a tamper alert in response to the first and/or second sensor units detecting a magnetic field from an external magnet.

11. The module according to claim 7, wherein the module is configured to be attached to a first frame member of the door or window, with the magnet attached to a second frame member of the door or window, the first and second frame members are positioned adjacent each other when the window or door is in a closed condition, the first and second frame members are configured to move apart from each other as the window or door moves towards an open condition, and the first and second sensor units are configured to detect movement of the magnet away from the module to determine movement of the window or door to the open condition.

12. The module according to claim 7, wherein the magnet path is a substantially linear path.

13. A method of operating a system in relation to a window or door having a lock or latch mechanism actuatable between a locked and an unlocked condition, the method including:

providing a module including first and second sensor units;

securing the module to a part of the window or door;

providing a magnet configured to be attached to a part of the lock or latch mechanism such that the magnet moves along a magnet path with actuation of the lock or latch mechanism, the magnet having a magnetic axis which is directionally aligned with the magnet path, the magnet path passing both of the first and second sensor units;

attaching the magnet to the part of the lock or latch mechanism;

using the module to determine a current condition of the lock or latch mechanism by using the first and second sensor units to sense changes in a polarity of a sensed magnetic field generated by the magnet as the magnet moves along the magnet path.

14. The method according to claim 13, wherein the magnet path extends from a first side of both the first and second sensor units to a second side of both the first and second sensor units.

15. The method according to claim 13, wherein the orientation of the magnet is reversible with respect to the module, and the method further includes using a controller of the module to learn an orientation of the magnet using the first and second sensor units.

16. The method according to claim 15, further including using the controller to generate a tamper alert in response to the first and/or second sensor units detecting a magnetic field from an external magnet.

17. The method according to claim 13, wherein securing the module to a part of the window or door includes attaching the module to a first frame member of the door or window, attaching the magnet to the part of the lock or latch mechanism includes attaching the magnet to a second frame member of the door or window, the first and second frame members being positioned adjacent each other when the window or door is in a closed condition, the first and second frame members being configured to move apart from each other as the window or door moves towards an open condition, and the method further including using the first and second sensor units to detect movement of the magnet away from the module to determine movement of the window or door to the open condition.

18. The method according to claim 13, wherein the magnet path is a substantially linear path.

* * * * *